(12) United States Patent
Lee et al.

(10) Patent No.: US 8,848,680 B2
(45) Date of Patent: Sep. 30, 2014

(54) METHOD AND APPARATUS FOR TRANSMITTING A FRAME IN A WIRELESS RAN SYSTEM

(75) Inventors: Dae Won Lee, Anyang-si (KR); Byeong Woo Kang, Anyang-si (KR); Yu Jin Noh, Anyang-si (KR); Bong Hoe Kim, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 13/318,019

(22) PCT Filed: Dec. 3, 2010

(86) PCT No.: PCT/KR2010/008650
§ 371 (c)(1),
(2), (4) Date: Oct. 28, 2011

(87) PCT Pub. No.: WO2011/068387
PCT Pub. Date: Jun. 9, 2011

(65) Prior Publication Data
US 2012/0044925 A1 Feb. 23, 2012

Related U.S. Application Data

(60) Provisional application No. 61/266,481, filed on Dec. 3, 2009, provisional application No. 61/312,634, filed on Mar. 10, 2010.

(51) Int. Cl.
*H04W 4/00* (2009.01)
*H04L 27/26* (2006.01)
*H04L 5/00* (2006.01)
*H04L 1/18* (2006.01)
*H04W 80/02* (2009.01)

(52) U.S. Cl.
CPC .......... *H04L 27/2602* (2013.01); *H04L 5/0023* (2013.01); *H04L 5/0091* (2013.01); *H04L 1/1812* (2013.01); *Y02B 60/50* (2013.01); *H04W 80/02* (2013.01)
USPC .......................................... 370/338; 455/517

(58) Field of Classification Search
USPC .......................................... 370/338; 455/517
See application file for complete search history.

(56) References Cited

U.S. PATENT DOCUMENTS 7,633,926 B1 * 12/2009 Sethi et al. ..................... 370/349
7,821,976 B2 * 10/2010 Kim et al. ..................... 370/311
2003/0108116 A1 6/2003 Kwon et al.

(Continued)

FOREIGN PATENT DOCUMENTS

CN 162765 A 6/2005
CN 101385281 A 3/2009

(Continued)

*Primary Examiner* — Wei Zhao
(74) *Attorney, Agent, or Firm* — Birch, Stewart, Kolasch & Birch, LLP

(57) ABSTRACT

There is provided a method and apparatus for transmitting a frame which is performed by a transmission STA in a WLAN system. The method of transmitting a frame according to the present invention includes generating an MAC Protocol Data Unit (MPDU) to be transmitted to a target station, generating a PLCP Protocol Data Unit (PPDU) by attaching a Physical Layer Convergence Procedure (PLCP) header to the MPDU, and transmitting the PPDU to the target station. The PLCP header comprises a partial Association ID (AID) of the target station.

10 Claims, 18 Drawing Sheets

(56) References Cited

U.S. PATENT DOCUMENTS

| | | |
|---|---|---|
| 2004/0160984 A1 | 8/2004 | Sidhushayana et al. |
| 2005/0147125 A1 | 7/2005 | Kim et al. |
| 2005/0186958 A1 | 8/2005 | Hansen et al. |
| 2005/0249244 A1 | 11/2005 | McNamara et al. |
| 2006/0056362 A1 | 3/2006 | Jang et al. |
| 2007/0058566 A1 | 3/2007 | Frederiks et al. |
| 2007/0167140 A1* | 7/2007 | Grandhi et al. ............... 455/88 |
| 2008/0049654 A1 | 2/2008 | Otal et al. |
| 2008/0181156 A1* | 7/2008 | Ecclesine ..................... 370/311 |
| 2009/0168770 A1 | 7/2009 | Mohanty |
| 2011/0103280 A1 | 5/2011 | Liu et al. |
| 2011/0149822 A1 | 6/2011 | Sammour et al. |
| 2013/0003628 A1 | 1/2013 | Christin et al. |

FOREIGN PATENT DOCUMENTS

| | | |
|---|---|---|
| JP | 2006-352806 A | 12/2006 |
| JP | 2013-510469 A | 3/2013 |
| JP | 2013-511182 A | 3/2013 |
| KR | 10-2006-0023932 A | 3/2006 |
| KR | 10-2007-0020033 A | 2/2007 |
| KR | 10-2007-0033287 A | 3/2007 |
| KR | 10-2008-0021816 A | 3/2008 |
| KR | 10-2008-0074854 A | 8/2008 |
| RU | 2 258 306 C2 | 8/2005 |
| RU | 2 341 903 C2 | 12/2008 |

* cited by examiner

METHOD AND APPARATUS FOR TRANSMITTING A FRAME IN A WIRELESS RAN SYSTEM

This application is a National Phase of PCT/KR2010/008650 filed on Dec. 3, 2010, which claims priority under 35 USC 119(e) to U.S. Provisional Application Nos. 61/266,481 and 61/312,634 filed on Dec. 3, 2009 and Mar. 10, 2010, respectively. All of which are hereby expressly incorporated by reference into the present application.

TECHNICAL FIELD

The present invention relates to wireless communication, and more particularly, to a method and apparatus for transmitting a frame in a Wireless Local Area Network (WLAN) system.

BACKGROUND ART

With the recent development of information communication technology, a variety of wireless communication techniques are being developed. From among the techniques, WLAN is a technique, enabling wireless access to the Internet at homes or companies or in specific service providing areas through mobile terminals, such as a Personal Digital Assistant (PDA), a laptop computer, and a Portable Multimedia Player (PMP), based on radio frequency technology.

Lots of standardization tasks are being carried out since Institute of Electrical and Electronics Engineers (IEEE) 802 (i.e., the standard organization for WLAN technique) was set up on February, 1980. The initial WLAN technique was able to support the bit rate of 1 to 2 Mbps through frequency hopping, band spreading, and infrared communication by using a 2.4 GHz frequency band in accordance with the IEEE 802.11 standard, but the recent WLAN technique can support a maximum bit rate of 54 Mbps using Orthogonal Frequency Division Multiplex (OFDM) method. Furthermore, in the IEEE 802.11 standard, the standardization of various techniques, such as the improvements of Quality of Service (QoS), the compatibility of Access Point (AP) protocols, security enhancement, radio resource measurement, wireless access vehicular environment for vehicle environments, fast roaming, a mesh network, interworking with an external network, and wireless network management, is put to practical use or being developed. Furthermore, in order to overcome a limit to the communication speed that has been considered as vulnerabilities in the WLAN technique, IEEE 802.11n has recently been standardized as a technology standard. The object of the IEEE 802.11n is to increase the speed and reliability of a network and to expand the coverage of a wireless network.

More particularly, the IEEE 802.11n standard is based on a Multiple Inputs and Multiple Outputs (MIMO) technique which uses multiple antennas on both sides of a transmitter and a receiver, in order to support a High Throughput (HT) having a data processing speed of 540 Mbps or higher, minimize transmission error, and optimize the data rate. Furthermore, the IEEE 802.11n standard may use not only a coding scheme for transmitting several redundant copies in order to increase reliability of data, but also an Orthogonal Frequency Division Multiplex (OFDM) scheme in order to increase the data rate.

With the spread of the WLAN technique being activated and applications using the WLAN technique being diversified, there is a need for a new WLAN system capable of supporting the throughput higher than the data processing speed supported by the IEEE 802.11n standard. However, an IEEE 802.11n Medium Access Control (MAC)/Physical Layer (PHY) protocol is not effective in providing the throughput of 1 Gbps or higher. This is because the IEEE 802.11n MAC/PHY protocol is for the operation of a station (STA) having a single Network Interface Card (NIC). Accordingly, if the throughput of frames is increased while the existing IEEE 802.11n MAC/PHY protocol remains intact, overhead is increased. Consequently, to improve the throughput of a wireless communication network while the existing IEEE 802.11n MAC/PHY protocol (i.e., the single STA architecture) remains intact is limited.

In order to achieve the data processing speed of 1 Gbps or higher in a wireless communication network, there is a need for a new system which is different from the existing IEEE 802.11n MAC/PHY protocol (i.e., the single STA architecture). A Very High Throughput (VHT) WLAN system is the next version of the IEEE 802.11n WLAN system. The VHT WLAN system is one of the recent IEEE 802.11 WLAN systems which are being newly proposed in order to support the data processing speed of 1 Gbps or higher in a MAC Service Access Point (SAP).

The VHT WLAN system enables a plurality of VHT STAs to access radio channels at the same time in order to efficiently use the channels. To this end, the VHT WLAN system supports transmission of a Multi-User Multiple Inputs Multiple Outputs (MU-MIMO) method using multiple antennas. A VHT Access Point (AP) can perform a Spatial Division Multiple Access (SDMA) transmission method of transmitting spatially multiplexed data to a plurality of VHT STAs. If a plurality of spatial streams is distributed into a plurality of STAs and transmitted at the same time using a plurality of antennas, the entire throughput of a WLAN system can be increased.

Legacy terminals, supporting WLAN systems (e.g., IEEE 802.11 a/b/g) anterior to the IEEE 802.11n WLAN system, and HT terminals supporting the IEEE 802.11n WLAN system may be basically operated in an active mode and a Power Saving (PS) mode. A terminal which is stably supplied with power using a power cable is relatively less sensitive to consumption efficiency because the power is stably supplied. On the other hand, a terminal operated by the battery of a certain capacity may be sensitive to power consumption efficiency because it must be operated within the limited power. From a viewpoint of terminal mobility, a terminal which is supplied with stable power through a power cable may have a limit to mobility. On the other hand, a terminal supplied with power from the battery may be less sensitive to mobility. In order to increase the power consumption efficiency of a terminal, a terminal may be operated in the PS mode. A terminal operating in the PS mode repeatedly switches between an awake mode and a sleep mode in order to efficiently use limited power.

Consideration to power consumption efficiency may still be an important issue even in the VHT WLAN system. Accordingly, a new Physical Layer Convergence Procedure (PLCP) frame format and a method of determining and transmitting control information to be transmitted through a PLCP frame need to be taken into consideration by taking power consumption efficiency into consideration in a WLAN system.

SUMMARY OF INVENTION

Technical Problem

Accordingly, the present invention has been made in view of the above problems, and it is an object of the present invention to provide a method of transmitting a PLCP frame that may be used in a WLAN system and an apparatus for supporting the method.

It is another object of the present invention to provide a method of reducing power of a station and an apparatus for supporting the method.

Technical Solution

In an aspect, a method of a transmission station transmitting a frame in a Wireless Local Area Network (WLAN) system includes generating an MAC Protocol Data Unit (MPDU) to be transmitted to a target station, generating a PLCP Protocol Data Unit (PPDU) by attaching a Physical Layer Convergence Procedure (PLCP) header to the MPDU and transmitting the PPDU to the target station, wherein the PLCP header comprises a partial Association ID (AID) of the target station.

The partial AID of the target station may be obtained from an AID allocated by an Access Point (AP) in a process of the target station being associated with the AP.

The length of the AID may be 16 bits and the partial AID may be set to 9 bits of a low order from among the 16 bits of the AID.

The partial AID may be included in a VHT-Signal (VHT-SIG) field of the PLCP header and the VHT-SIG field may include control information necessary for the target station to receive the PPDU and to demodulate and decode the PPDU.

The partial AID may include information indicating whether each of the transmission station and the target station is an AP or a non-AP station.

In another aspect, a method of a transmission station transmitting a frame in a WLAN system includes generating a plurality of MPDUs to be transmitted to a plurality of respective target stations, generating PPDUs by attaching a PLCP header to the plurality of MPDUs and simultaneously transmitting the PPDUs to the plurality of target stations, wherein the PLCP header comprises a group ID indicating the plurality of target stations.

The group ID may be included in a VHT-SIG field of the PLCP header and the VHT-SIG field includes control information in common applied to the plurality of target stations.

In still another aspect, a station operating in a WLAN system includes a transceiver configured to transmit or receive a PPDU, and a processor functionally connected to the transceiver, wherein the processor is configured to generate an MPDU to be transmitted to a target station, generate a PPDU by attaching a PLCP header to the MPDU and transmit the PPDU to the target station, and the PLCP header comprises a partial AID of the target station.

The partial AID of the target station may be obtained from an AID allocated by an AP in a process of the target station being associated with the AP.

The length of the AID maybe of 16 bits and the partial AID is set to 9 bits of a low order from among the 16 bits of the AID.

The partial AID may be included in a VHT-SIG field of the PLCP header and the VHT-SIG field includes control information necessary for the target station to receive the PPDU and to demodulate and decode the PPDU.

The partial AID may include information indicating whether each of the transmission station and the target station is an AP or a non-AP station.

Advantageous Effects

There are provided a PLCP frame format applicable to a WLAN system, a method of transmitting the PLCP frame, and an apparatus for supporting the method. The power consumption efficiency of a station of a WLAN system can be increased and an efficient operation according to the type of traffic is possible, by using a new PLCP frame proposed by the present invention.

MODE FOR INVENTION

Some embodiments of the present invention will be described in detail below with reference to the accompanying drawings.

A WLAN system in which an embodiment of the present invention is implemented includes at least one Basic Service Set (BSS). The BSS is a set of STAs (stations) successfully synchronized with each other for mutual communication. The BSS may be classified into an independent BSS (MSS) and an infrastructure BSS.

The infrastructure BSS includes at least one STA and at least one AP (Access Point). The AP is a function medium for providing connection through the wireless medium of each STA within the BSS. The AP may also be called another terminology, such as a centralized controller, a Base Station (BS), and a scheduler.

The STA is a specific function medium, including an MAC (medium access control) and PHY (wireless-medium physical layer) interface to satisfy the IEEE 802.11 standard. The STA may be an AP STA or a non-AP STA, but refers to a non-AP STA different to an AP, unless described otherwise hereinafter. The STA may also be called another terminology, such as User Equipment (UE), a Mobile Station (MS), a Mobile Terminal (MT), a portable device, or an interface card.

The STA may be classified into a VHT-STA, an HT-STA, and a Legacy (L)-STA. The HT-STA refers to an STA supporting the IEEE 802.11n standard, and the L-STA refers to an STA supporting the lower version of the IEEE 802.11n standard (e.g., the IEEE 802.11a/b/g standards). The L-STA is also called a non-HT STA.

Figure 1:
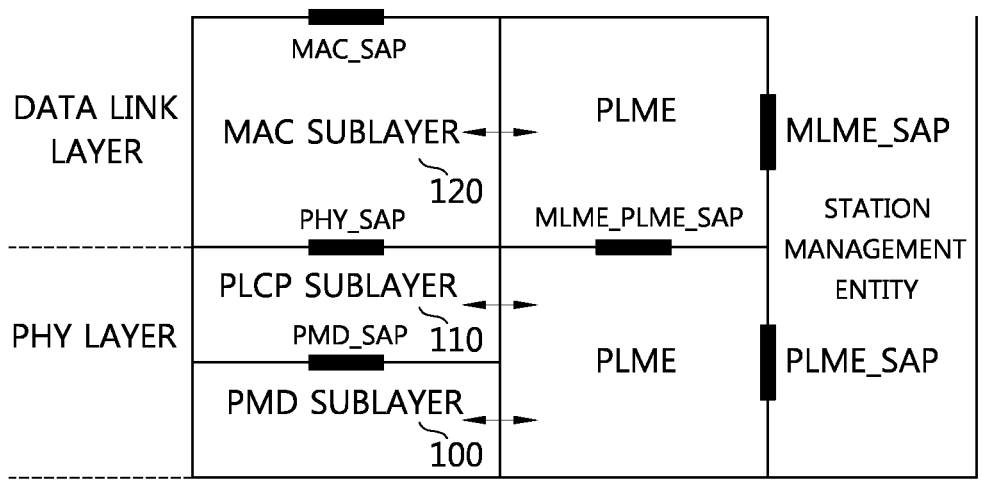
FIG. 1 is a diagram showing the physical layer architecture of IEEE 802.11.

FIG. 1 is a diagram showing the physical layer architecture of the IEEE 802.11 standard.

The PHY layer architecture of the IEEE 802.11 standard includes a PHY Layer Management Entity (PLME), a Physical Layer Convergence Procedure (PLCP) sublayer 110, and a Physical Medium Dependent (PMD) sublayer 100. The PLME provides a function of managing the PHY layer, while operating in conjunction with a MAC Layer Management Entity (MLME). The PLCP sublayer 110 transfers a MAC Protocol Data Unit (MPDU), received from a MAC sublayer 12, to the PMD sublayer 100 or transfers a frame, received from the PMD sublayer 100, to the MAC sublayer 120 according to an instruction of the MAC layer 120 between the MAC sublayer 120 and the PMD sublayer 100. The PMD sublayer 100 is a lower layer of the PLCP, and it enables the transmission and reception of physical layer entities between two STAs through a wireless medium.

The PLCP sublayer 110 adds supplementary fields, including information necessary for physical layer transmitter and receiver, in a process of receiving an MPDU from the MAC sublayer 120 and transferring the MPDU to the PMD sublayer 100. The added fields may become tail bits over a PLCP preamble, a PLCP header, and a data field in the MPDU. The PLCP preamble functions to have a receiver prepared for a synchronization function and antenna diversity before a PLCP Service Data Unit (PSDU)(=MPDU) is transmitted. The PLCP header includes a field including information about a frame. The PLCP header will be described in more detail later with reference to FIG. 2.

In the PLCP sublayer 110, a PLCP Protocol Data Unit (PPDU) is created by adding the above-described field to the MPDU and then transmitted to a reception STA via the PMD sublayer 100. The reception STA receives the PPDU, obtains information for restoring data from the PLCP preamble and the PLCP header, and restores the data based on the information.

Figure 2:
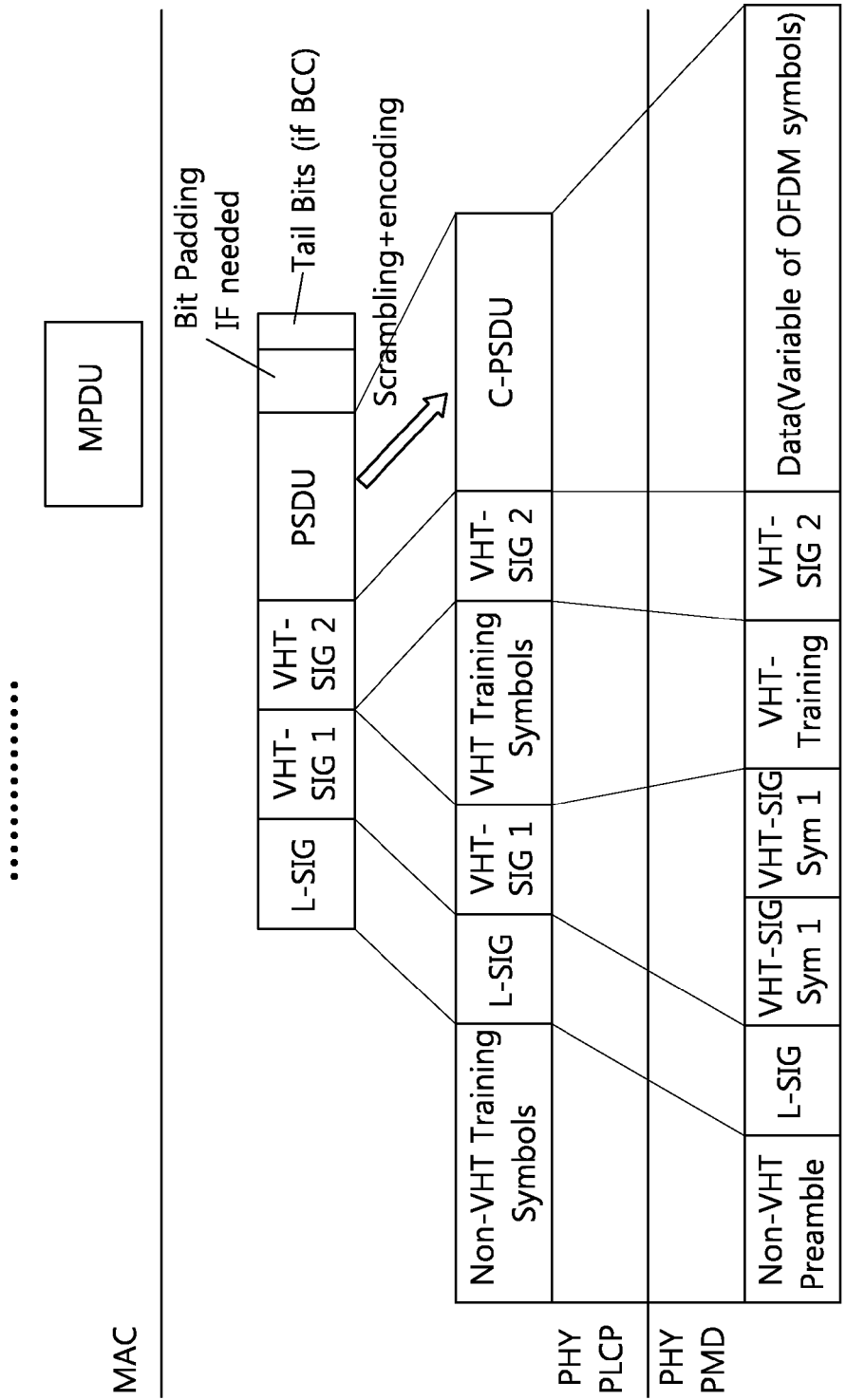
FIG. 2 shows an example of a procedure of transmitting a PLCP frame.

FIG. 2 shows an example of a procedure of transmitting the PLCP frame.

The MPDU of the MAC sublayer is transferred to the PLCP sublayer of the PHY layer for transmission through a wireless medium. In the PLCP sublayer, an L-SIG field, including control information about an L-STA, and a VHT-SIG1 field and a VHT-SIG2 field, including control information about a VHT STA, are added, and padding bit may be added as occasion demands. Furthermore, tail bits may be further added according to an encoding scheme. Here, non-VHT training symbols and VHT training symbols are added. The non-VHT training symbols are used for a reception STA to obtain frame timing acquisition, Automatic Gain Control (AGC), and coarse frequency and may be used for channel estimation for demodulating L-SIG and VHT-SIG1 fields. The VHT training symbols may be used for channel estimation for demodulating a VHT-SIG2 field.

The MPDU of the MAC sublayer is transmitted from the PMD sublayer to a counterpart STA through a wireless medium via the PLCP sublayer. In the PMD layer, the PPDU transmitted through a wireless medium includes a non-VHT preamble, fields, such as L-SIG, VHT-SIG1, VHT-SIG2, VHT-training, and VHT-SIG2, and data fields. Hereinafter, in the PLCP layer of a transmission STA (including an AP), fields added to the PSDU received from the MAC layer are generally referred to as a PLCP preamble and a PLCP header.

The PLCP frame according to the embodiment of the present invention includes information about a target STA. The target STA information may be included in a field added to the MPDU in the PLCP sublayer or may be added as a separate field and transmitted. The target STA information is different from a receiver address (or a receiving station address RA) or a destination address (DA) in the MAC protocol layer, included in the MPDU. In other words, in the MAC protocol layer, unlike a receiver address or a destination address set in the address field of an MAC header and then transmitted, the target STA information of the present invention is added to the MPDU in the PLCP sublayer and then transmitted. For example, in the transmission of the target STA information according to the present invention, the target STA information may be included in the VHT-SIG field added in the PLCP sublayer and then transmitted. Hereinafter, a detailed example of the target STA information and an operation of an STA receiving or overhearing the PLCP frame proposed by the present invention are described in connection with various embodiments.

Figure 3:
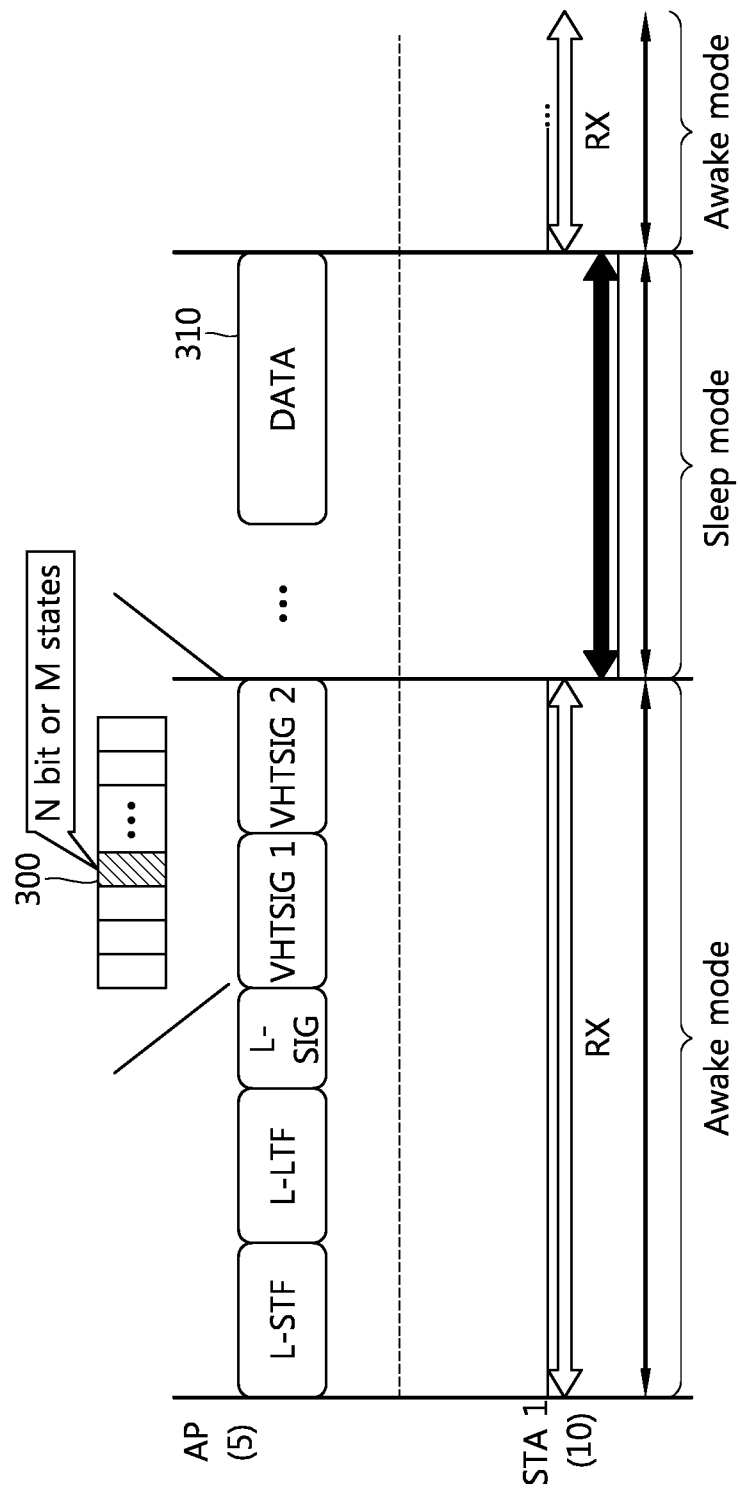
FIG. 3 shows an example of the configuration of the PLCP frame and of the transmission of target STA information according to an embodiment of the present invention.

FIG. 3 shows an example of the configuration of the PLCP frame and of the transmission of target STA information according to an embodiment of the present invention.

In the example of FIG. 3, an AP (5) is illustrated to transmit the PLCP frame to an STA 1 (10), but the present invention is not limited thereto. A terminal transmitting the PLCP frame may be an STA, and a terminal receiving the PLCP frame may be an STA or an AP.

The AP (5) adds a PLCP preamble and a PLCP header to an MSDU, including data 310 to be transmitted to the STA 1 (10), in a PLCP sublayer implemented in the AP (5). Here, target STA information may be included in a VHT-SIG1 or VHT-SIG2 field. More particularly, the VHT-SIG1 or VHT-SIG2 field may include N bits including the target STA information. The N bits included in the VHT-SIG1 or VHT-SIG2 field may directly indicate the target STA information, or the N bits may have a form indicating any one of M kinds of states that may be represented by the N bits. That is, the N bits may be index information to indicate any one of M kinds of preset states.

In a WLAN system, while an STA does not perform transmission, the STA performs carrier sense in order to receive radio frames that are not known when they are received. If carriers are detected as a result of the carrier sense, the STA determines whether relevant data packets in the MAC sublayer are information for its own by demodulating the data packets. Accordingly, the STA consumes power in order to demodulate and decode all received data packets. It leads to a reduction in the power efficiency of the STA.

The target STA information included in the PLCP header may be used to increase the power efficiency of an STA which receives or overhears the PLCP frame. The receiving or overhearing STA may determine whether to enter a sleep mode based on the target STA information in order to reduce demodulation and decoding for unnecessary data packets.

This is described with reference to the example of FIG. 3. The PLCP header of the PLCP frame transmitted by the AP (5) includes the N bits or comparable M pieces of the state information 300. If the STA 1 (10) reads the header of the PLCP frame transmitted by the AP (5) and knows that the header of the PLCP frame is not for its own data or information, the STA 1 (10) does not need to decode subsequent fields. In this case, the STA 1 (10) may switch to the sleep mode. Here, the VHT-SIG field may further include period information, indicating the period in which the STA 1 (10) will be operated in the sleep mode. During the period indicated by the period information, the STA 1 (10) may be operated in the sleep mode. The period in which the STA 1 (10) is operated in the sleep mode may be a period until the data field 310 is transmitted or until an ACK frame for data is transmitted. In the case where an ACK frame for data is not immediately transmitted and data is consecutively transmitted according to an ACK policy, the STA 1 (10) may be operated in the sleep mode until the data field of a first PLCP frame is transmitted.

In the example of FIG. 3, the target STA information transmitted through the N bits may be ID information about the STA. That is, if a physical ID that may be represented by the N bits or the comparable M pieces of state information is assigned to each STA, the STA can distinguish information assigned thereto from information assigned to another STA. Accordingly, the STA does not need to detect all pieces of information as in the operations of the existing STAs. In other words, if a corresponding PLCP frame is determined to be unnecessary for itself or to be information for other STAs, a corresponding STA may switch to the sleep mode in order to reduce power consumption.

The physical ID may be, for example, a group ID. In the group ID, STAs that may become candidates for supporting an MU-MIMO operation is grouped into one group, and a group ID is assigned to the group. An STA determines that a PLCP frame, having the same group ID as a group to which the STA belongs, is for its own and that a PLCP frame, having a different group ID from the group to which the STA belongs, has data/information unnecessary for the STA. Accordingly, the STA may no longer perform demodulation and decoding for the relevant PLCP frame and switch to the sleep mode.

Figure 4:
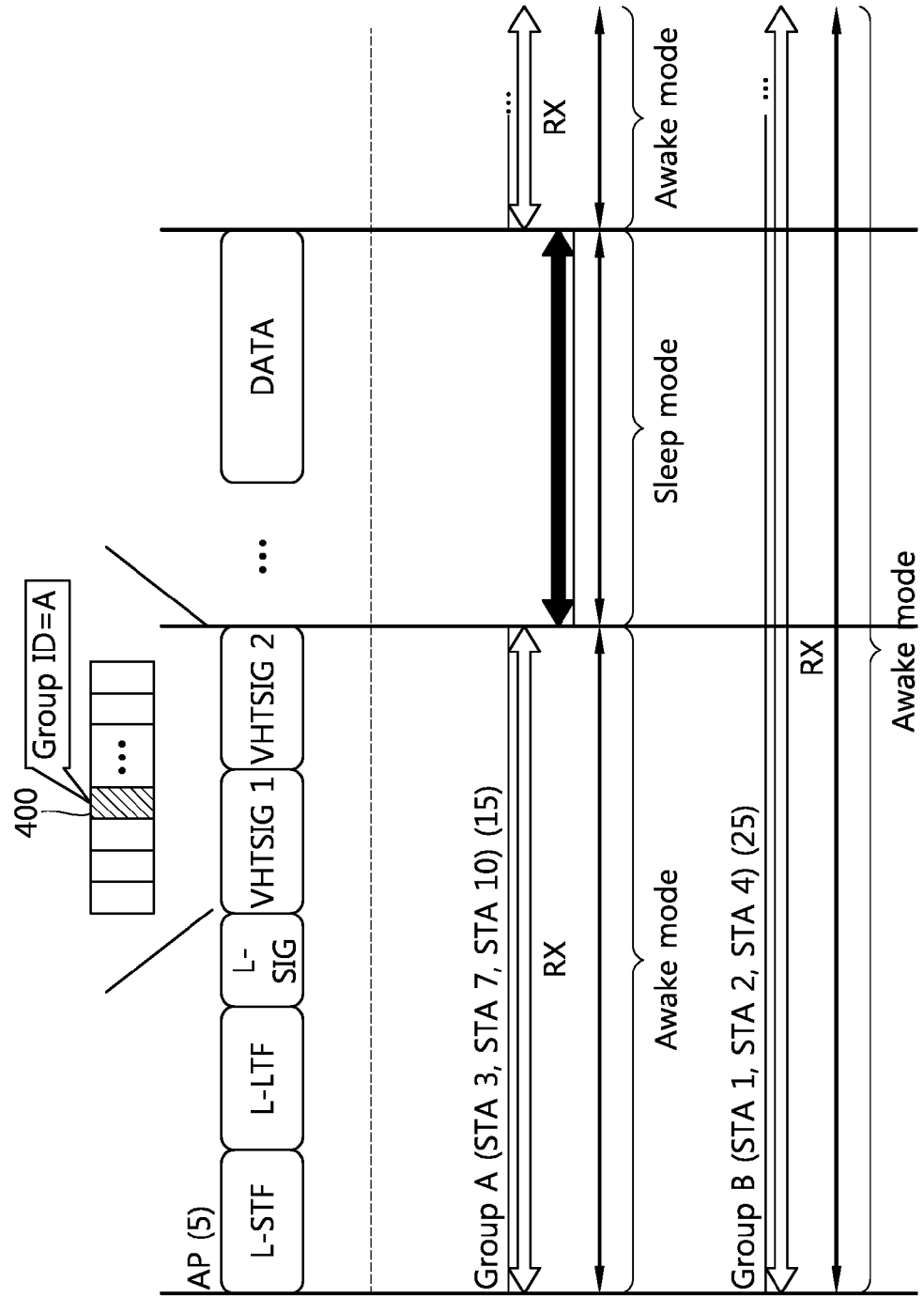
FIG. 4 shows an example in which a group ID is included in a PLCP header and transmitted.

FIG. 4 shows an example in which the group ID is included in the PLCP header and transmitted.

In FIG. 4, it is assumed that an STA 1, an STA 2, and an STA 4 constitute a Group A (15) and assigned a Group ID=A, and an STA 3, an STA 7, and an STA 10 constitute a Group B (25) and assigned a Group ID=B. Here, if the data of a PLCP frame is transmitted to the STAs of the Group A (15), the STAs belonging to the Group B (25) knows that the data of a PLCP frame is unnecessary based on group ID information 400 included in the PLCP header of the PLCP frame and may switch to the sleep mode without further demodulation or decoding for subsequent fields.

In the above method, an STA that has received the PLCP frame determines whether the PLCP frame is unnecessary based on the physical ID included in the PLCP header. According to another embodiment of the present invention, Cyclic Redundancy Check (CRC) masking may be used in the PLCP frame. In other words, if a specific sequence given to each STA is masked to a CRC and transmitted, an STA can determine whether corresponding information is given to or necessary for the STA in a process of detecting the preamble of a PLCP frame. If the information is determined to be for another STA, the STA may switch to the sleep mode.

Figure 5:
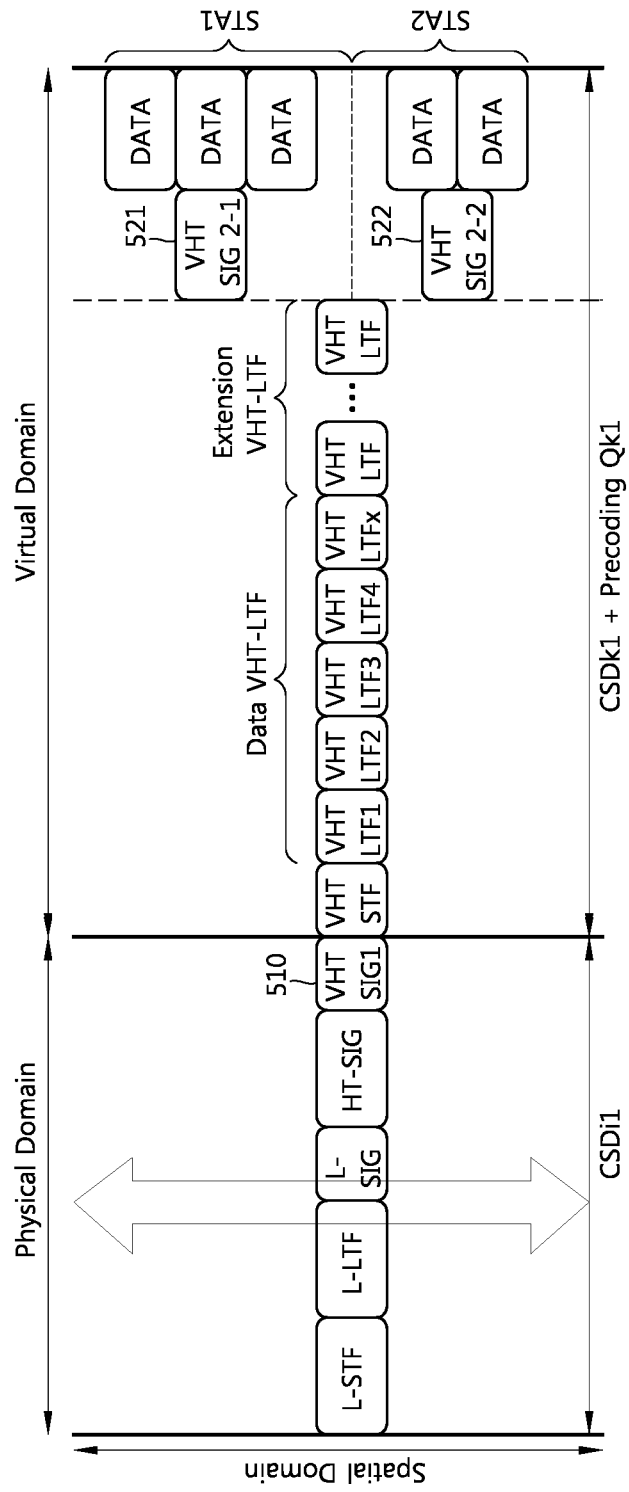
FIG. 5 shows an example of a PLCP frame format to which the present invention may be applied.

FIG. 5 shows an example of a PLCP frame format to which the present invention may be applied.

The example of FIG. 5 shows a case where data is transmitted to an STA 1 and an STA 2 according to the MU-MIMO method. A VHT-SIG1 field 510 is transmitted omni-directionally without precoding so that it can be received and recognized by all STAs. The VHT-SIG1 field 510 includes information common to all STAs. For example, information about which stream is allocated to each STA, information about the total number of streams, and so on may be transferred to each STA through the VHT-SIG1 field 510.

The VHT-SIG1 field 510 and the VHT-LTF field may be transmitted in a non-overlapping manner Next, a VHT-SIG2-1 field 521 and a VHT-SIG2-2 field 522, including data information and control information for each STA, may be transmitted in an overlapping manner. The VHT-SIG2-1 field 521 and the VHT-SIG2-2 field 522 may be placed at the rear of the preamble.

Assuming that the VHT-SIG1 field 510, including the common control information for STAs, and the VHT-SIG2-1 field 521 and the VHT-SIG2-2 field 522, including the control information for each of the STAs, include bits for a CRC, CRC masking may be performed on the CRC bits included in the VHT-SIG2-1 field 521 and the VHT-SIG2-2 field 522 which include the information unique to each STA. If a specific sequence for each STA is masked to the CRC of the VHT-SIG2 field, including the control information for each STA, and transmitted, the STA can determine whether data/information is for its own in a process of detecting a PLCP frame. If the data/information is determined to be for another STA, the STA may switch to the sleep mode.

Figure 6:
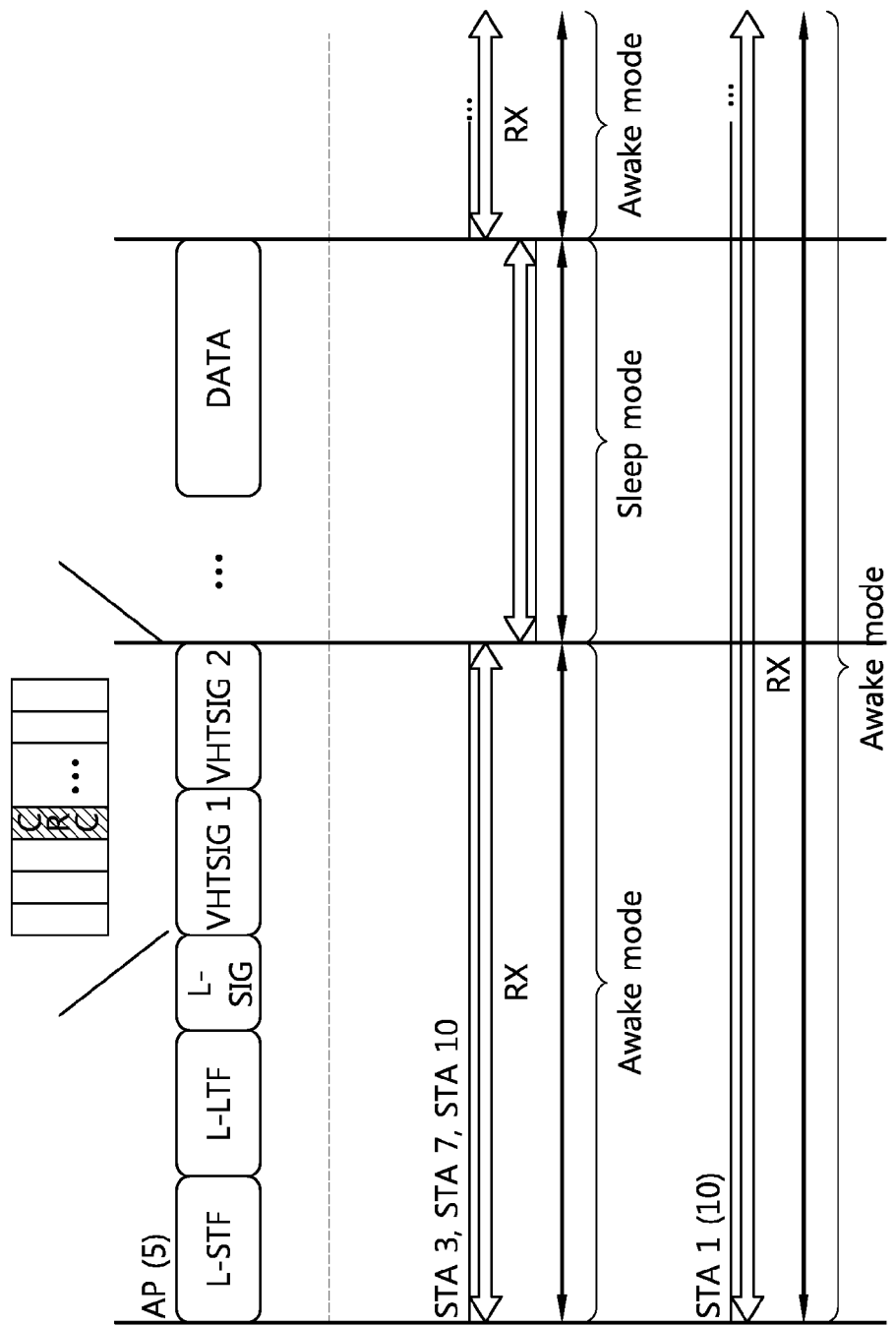
FIG. 6 shows an example in which a unique sequence of an STA to which data will be transmitted is masked to the CRC value of a VHT-SIG field and transmitted.

FIG. 6 shows an example in which a unique sequence of an STA to which data will be transmitted is masked to the CRC value of a VHT-SIG field and transmitted. Each STA determines whether data is transmitted to himself by comparing a STA-specific ID and a masked value. If, as a result of the determination, the data is determined not to be its own data, the STA may switch to the sleep mode in order to reduce power consumption. In the example of FIG. 6, a STA-specific ID of an STA 1 (10) is masked to a CRC and then transmitted. Accordingly, the STA 1 (10) remains in the RX mode (i.e., an awake mode), but the remaining STAs (i.e., an STA 3, an STA 7, and an STA 10) decode VHT-SIG fields and then switch to the sleep mode.

In accordance with another embodiment of the present invention, the VHT-SIG field of the PLCP header may include a field, providing information about whether an STA will continue to perform overhearing.

When an STA A and an STA B transmit data frames after exchanging a Request To Send (RTS) frame and a Clear To Send (CTS) frame, surrounding STAs overhear the entire process. If the surrounding STAs do not overhear relatively short control frames, such as RTS/CTS frames transmitted in order to avoid collision, but overhear relatively long data frames for other STAs, it is waste from a viewpoint of power efficiency.

In order to solve the problem, information (e.g., a non-overhearing bit) to indicate whether other STAs will continue to perform overhearing may be transmitted. In accordance with an embodiment of the present invention, the VHT-SIG field of the PLCP frame may include the non-overhearing bit. The non-overhearing bit may have a length of 1 bit. If the non-overhearing bit is set to 0 (non-overhearing bit==0) and transmitted, an STA which has received the non-overhearing bit continues to perform overhearing. If the non-overhearing bit is set to 1 (non-overhearing bit==1) and transmitted, an STA which has received the non-overhearing bit may does not continue to perform overhearing, but switch to the sleep mode. The RTS frame and the CTS frame are frames that all STAs must overhear in order to avoid collision. Accordingly, an STA that transmits the RTS frame or the CTS frame may set the non-overhearing bit to 0 and transmit the set non-overhearing bit. Meanwhile, in the case where data is transmitted, the non-overhearing bit may be set to 1 and transmitted in order to prevent STAs, other than an STA that must receive the data, from continuing to perform unnecessary overhearing.

For another example, the non-overhearing bit may be added to information transmitted in uplink (UL) and information transmitted in downlink (DL) and then transmitted so that an STA can reduce power. Here, UL transmission means that one or more STAs transmit radio frames to an AP, and DL transmission means that an AP transmits radio frames to one or more STAs.

In the case of DL transmission, an STA needs to sense the busy/idle state of a medium and to continue to perform overhearing in order to receive its own radio frame. Accordingly, in DL transmission, the non-overhearing bit may be set to 0 and transmitted. On the other hand, in UL transmission, since an STA transfers information to only an AP, other STAs do not need to perform overhearing. In other words, the non-overhearing bit may be set to 1 and transmitted.

An AP may set the non-overhearing bit to 1 and transmit the set non-overhearing bit, when sending a data frame to a specific STA. An AP may set the non-overhearing bit to 0 and transmit the set non-overhearing bit, when sending a multicast frame or a broadcast frame.

An STA may set the non-overhearing bit to 1 when sending a data frame to an AP and set the non-overhearing bit to 0 when sending a data frame to another STA.

If the non-overhearing bit is set to 1, an STA does not receive an MPDU following a PLCP header, but may switch to the sleep mode. If the non-overhearing bit is set to 0, however, an STA has to receive both the PLCP header and the subsequent MPDU.

Figure 7:
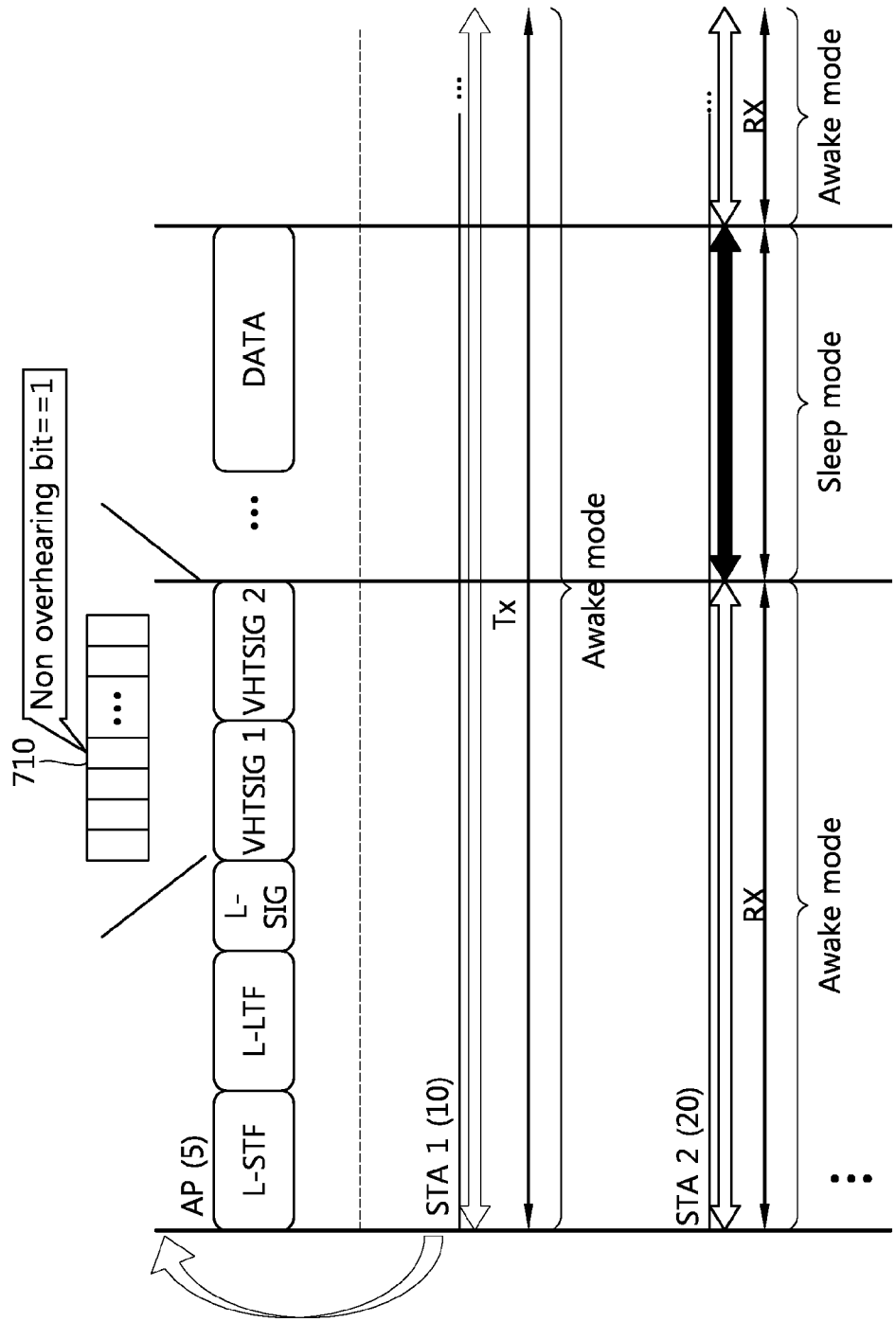
FIGS. 7 and 8 show examples in which a UL data frame and a DL data frame are transmitted according to an embodiment of the present invention.
Figure 8:
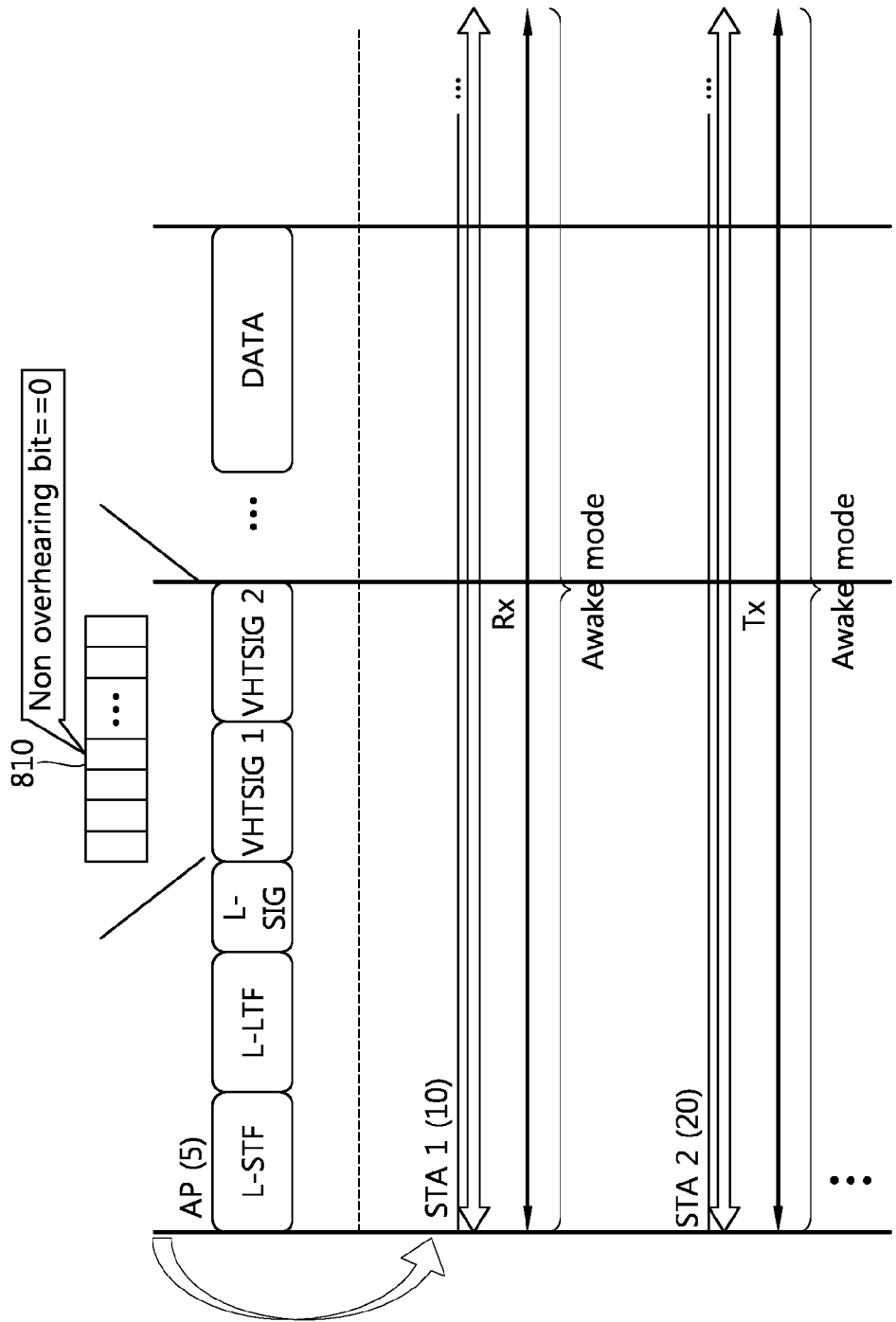

FIGS. 7 and 8 show examples in which a UL data frame and a DL data frame are transmitted according to an embodiment of the present invention.

In FIG. 7, when an STA 1 (10) transmits a UL data frame to an AP (5), an STA 2 (20) determines that fields subsequent to VHT-SIG fields need not to be decoded by checking a non-overhearing bit 710 set to 1 in a VHT-SIG field and switches to the sleep mode.

In FIG. 8, when an AP (5) transmits a DL data frame to an STA 1 (10), an STA 2 (20) maintains the RX mode (i.e., an awake mode) in which a radio frame can be received because it has to sense the state of a medium. Here, a non-overhearing bit 810 included in the VHT-SIG field of a data frame transmitted by the AP (5) may be set to 0.

The embodiment of the present invention described above with reference to FIGS. 7 and 8 shows an example in which the non-overhearing bit, indicating whether STAs will continue to perform overhearing, is included in the PLCP header and then transmitted. In accordance with another embodiment of the present invention, the PLCP header may include a transmission type field/bit stream, including information indicating a class according to a transmission type.

Table 1 shows classes according to transmission types. In the class types of Table 1, the sequence is arbitrary, and the present invention is not limited thereto. The details are exemplary and may be reduced or increased as occasion demands.

TABLE 1

| CLASS TYPE | DETAILS |
|---|---|
| 1 | AP → STA |
| 2 | STA → AP |
| 3 | STA → STA |
| 4 | AP → AP |
| 5 | Broadcasting |
| ... | ... |

A bit stream indicating the transmission type class may be included in the VHT-SIG field. An STA may check the transmission type (e.g., DL transmission, UL transmission, or broadcasting) of a relevant PLCP frame based on a bit stream indicating a transmission type class and determine whether to switch to the sleep mode.

In accordance with another embodiment of the present invention, indication information for distinguishing an STA and a BSS from each other may be included in the VHT-SIG field. An association ID (AID) may be used as indication information for distinguishing STAs from each other. A BSS ID may be used as indication information for distinguishing BSSs from each other. The indication information is described in detail below in connection with embodiments.

An IEEE 802.11n WLAN system supports SU-MIMO transmission using a maximum of four spatial streams, but a VHT WLAN system can support MU-MIMO transmission in addition to SU-MIMO transmission. In the transmission of a radio frame using SU-MIMO and the transmission of a radio frame using MU-MIMO, if the same PLCP frame format is used, some of control information included in the VHT-SIG field in order to support MU-MIMO may have nothing influence if transmission using SU-MIMO is performed. In other words, the control information may become unnecessary information. For example, if a group ID, indicating STAs (i.e., the subject of MU-MIMO transmission), and information, indicating a stream number allocated to each target STA of MU-MIMO transmission, are included in the VHT-SIG field in order to support MU-MIMO transmission, the group ID and the information may become meaningless information for an STA operating according to the SU-MIMO scheme.

Assuming that 4 MU-MIMO transmission target STAs can receive 0 to 4 spatial streams, respectively, 4 bits for setting a group ID to indicate the four MU-MIMO transmission target STAs and a maximum of 12 bits to indicate stream numbers may be used in the VHT-SIG field. In accordance with SU-MEMO transmission, to transmit the 12 bits may be meaningless or waste of radio resources. Accordingly, in accordance with the SU-MIMO transmission, a scheme for transmitting different pieces of information that may be used in the SU-MIMO transmission by using bits used to inform information for MU-MIMO transmission may be taken into consideration.

An AP or an STA trying to transmit a radio frame may include different pieces of information in data according to a case where the data is sought to be transmitted in the MU-MIMO format and a case where the data is sought to be transmitted in the SU-MIMO format, when generating the VHT-SIG field. An AP or an STA that has received the radio frame may interpret that a VHT-SIG field within a PLCP header indicates different pieces of information by dividing a case where the radio frame is received according to SU-MIMO transmission and a case where the radio frame is received according to MU-MEMO transmission, when interpreting the VHT-SIG field.

For example, when an SU/MU-MIMO indication bit to indicate SU-MIMO transmission or MU-MIMO transmission means the SU-MIMO transmission, an STA may differently interpret a bit stream indicative of a group ID within a VHT-SIG field and a bit stream indicative of the number of spatial streams in the case of the MU-MIMO transmission. Here, the group ID is an ID to indicate the group of target STAs according to MU-MIMO transmission, and the number of spatial streams indicates the number of spatial streams that must be received by each of the target STAs according to MU-MIMO transmission.

As an example in which a bit stream is differently interpreted, according to SU-MIMO transmission, an STA may interpret a bit stream indicative of a group ID and a bit stream indicative of the number of spatial streams as a bit stream in which an AID and operated. This is described from a viewpoint of a transmission STA (including an AP). If the transmission STA is sought to perform SU-MIMO transmission, the transmission STA may set an AID in a VHT-SIG field, instead of the bit stream indicative of a group ID and the bit stream indicative of the number of spatial streams, and transmit the association ID. Here, a BSS ID other than the AID may be included in the VHT-SIG field as information which is set instead of the bit stream indicative of a group ID and the bit stream indicative of the number of spatial streams and then transmitted.

An AID that an AP, supporting the IEEE 802.11 standard, may allocate the AID to an STA in the association process may have a length of 16 bits, and the 16 bits may include 14 Least Significant Bits (LSBs) and 2 Most Significant Bits (MSBs) 2 bits. The AID value has a value ranging from 1 to 2007 and thus requires a minimum of 11 bits in order to represent 1 to 2007. A BSS ID is an ID of a BSS. In the case of an infrastructure BSS, the BSS ID may be the MAC address of an AP and is information corresponding to 6 bytes. In the AID and the BSS ID, all bit fields that can be included in the AID and the BSS ID may be difficult to be accommodated in a limited VHT-SIG field. Accordingly, the AID and the BSS ID may be mapped to a specific power save ID by reducing the bits through a hash function and then used. As an example of hashing, only part of the bits of the AID or BSS ID may be used as a power save ID.

In the case where bit fields allocated to a VHT-SIG field are insufficient and thus may not be used to include and transmit the entire AID, some of the AID may be included in the VHT-SIG field. For example, an AP may include 9 LSB bits, from among the 16 bits of an AID allocated in the association process, and a partial AID, corresponding to the 9 LSB bits of a lower order, in a VHT-SIG field and transmit the VHT-SIG field.

The above method in which the transmission STA transmits different pieces of information, included in the VHT-SIG field, according to the MU-MIMO transmission scheme and the SU-MIMO transmission scheme and the reception STA differently interprets the information, included in the VHT-SIG field, according to the MU-MIMO transmission scheme and the SU-MIMO transmission scheme may be used as a method for increasing the power consumption efficiency of an STA.

An STA reads the AID or partial AID which is included in the VHT-SIG and transmitted. If the AID is not identical with its own AID or partial AID, the STA determines that a corresponding PLCP frame is unnecessary and may switch to the sleep mode without decoding for subsequent fields.

In another embodiment, information about a combination of indicators (e.g., BSS IDs) for distinguishing an AID and a BSS from each other may be included in the VHT-SIG field and then transmitted. In this case, only STAs having an AID included in a specific BSS may receive data, but STAs not having the AID included in the specific BSS may switch to the sleep mode. This may be usefully used in an OBSS environment and will be described in detail later with reference to relevant drawings.

Figure 9:
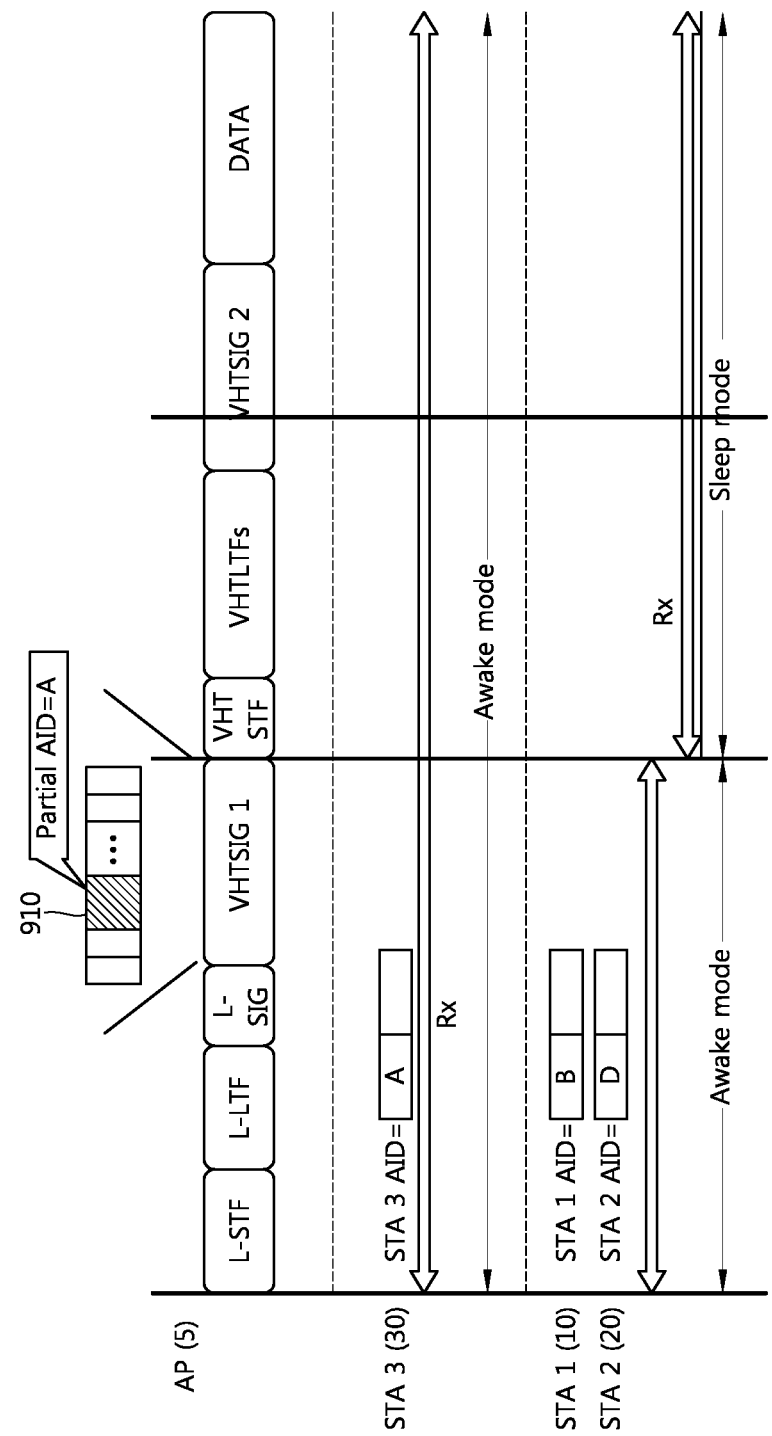
FIG. 9 shows an example in which a partial AID is included in a VHT-SIG field and transmitted.

FIG. 9 shows an example in which a partial AID is included in a VHT-SIG field and transmitted.

In the example of FIG. 9, an AP (5) transmits a PLCP frame 900 to an STA 3 (30). A VHT-SIG1 field included in the PLCP header of the PLCP frame 900 includes a partial MD 910. As described above, the partial AID is obtained by taking some of the bits of the AID that an AP allocates the AID to each STA in an association process with the STA. In the example of FIG. 9, the partial AID 910 is set to A, which is the value of 9 LSB its of an AID of the STA 3 (30). In other words, in the example of FIG. 9, the AP (5) includes the partial AID of the STA 3 (30) in the VHT-SIG1 field and transmits the VHT-SIG1 field.

An STA 1 (10) and an STA 2 (20), other than the STA 3 (30) whose partial ID is A, may switch to the sleep mode because they need not to read information about fields transmitted subsequently to the VHT-SIG1 field.

For another example, the partial AID may be included in a VHT-SIG2 field and then transmitted. In this case, the STA 1 (10) and the STA 2 (20) may read up to the VHT-SIG2 field and switch to the sleep mode by checking that a corresponding frame is unnecessary for him.

In order to utilize the partial AID according to an embodiment of the present invention, an AP allocates the partial MD to different STAs so that the partial AID is not redundant to the different STAs, in relation to bits that may be used as the partial AID, when performing an association process with the STAs. For example, in the case where N bits anterior to the partial MD are used as the partial AID, an AP may allocate different N bits to a $2^N$ number of STAs in an association process with the STAs. The number of STAs that can be distinguished from each other by using 11 bits is 2007, but it is unrealistic for an AP to manage about 2007 STAs at the same time. Accordingly, if $2^N$ is greater than the number of STAs that are managed by an AP at the same time, all the 11 bits of the partial AID may not be used, but N bits may be used. Hereinafter, the N bits is defined as a partial AID or a power save ID and used.

If an AP manages the number of STAs greater than $2^N$ (i.e., the number of STAs that can be managed using a power save ID), an STA that is associated with the AP at a $(2^N+1)^{th}$ position may share a power save ID already being used. It is preferred that several STAs not share one power save ID, if possible. It is assumed that when a $2^N$ number of STAs are associated with an AP, an STA 1=power save ID 1, an STA 2=power save ID 2, ..., an STA $2^N$ power save ID 2, an STA $2^N+1$=power save ID 1, and an STA $2^N+2$=power save ID 1. In the case where the three STAs share the one power save ID 1 as described above, if the AP includes the power save ID 1 in the VHT-SIG field and transmits the VHT-SIG field in order to transmit data to the STA 1, the STA $2^N+1$ and the STA $2^N+2$ may not switch to the sleep mode, although the data is unnecessary for the STA $2^N+1$ and the STA $2^N+2$.

A power save ID may be usefully used even in supporting MU-MIMO transmission. When an AP tries to transmit a specific spatial stream using MU-MIMO transmission to an STA 1, the STA 1, an STA 2, and an STA 3 may think that the specific spatial stream is allocated thereto and may operate. This is because the STAs are basically operated in the RX mode (i.e., a reception standby state) in order to receive a radio frame that is not known when the radio frame will be received to the STAs. This problem is generated because a radio frame does not include ID information for determining whether the radio frame is transmitted to which STA in the physical level and thus STAs receive all radio frames whose carries are detected according to Clear Channel Assessment (CCA) and perform demodulation and decoding for the radio frames.

If information, indicating that a PLCP frame is for which STA, is included in the VHT-SIG field of the PLCP frame, the above problem can be solved. Here, the VHT-SIG field may be the VHT-SIG2 field of FIG. 9 which is configured to include control information for each STA and transmitted. For example, in the example of FIG. 9, the STA 1 (10) and the STA 2 (20) which have read a power save ID meaning the AID of the STA 3 (30), included in the VHT-SIG2 field that may be called an STA-specific SIG field and transmitted, may reduce power consumption by switching to the sleep mode.

In a WLAN system, an STA always basically maintains the RX mode (i.e., a reception standby state). When a radio frame is transmitted through a specific spatial stream, several STAs simultaneously attempt to demodulate and decode the radio frame transmitted through the spatial stream. In MU-MIMO transmission, a VHT-SIG1 field may be called a common VHT-SIG field including common information about all STAs. Accordingly, an AP includes a power save ID in a VHT-SIG2 field that may be called an STA-specific VHT-SIG field and transmits the VHT-SIG2 field so that each of the STAs can determine whether to switch to the sleep mode.

If the above power reduction method used in the BSS environment is applied to an OBSS environment without change, an STA operated in an area in which BSAs of a plurality of BSSs constituting an OBSS are overlapped with each other may not switch to the sleep mode based on STA ID information in the physical layer level, such as power save IDs or group IDs transmitted by several APs. For example, in the case of a group ID, a situation, such as that shown in FIG. 10, may be generated.

Figure 10:
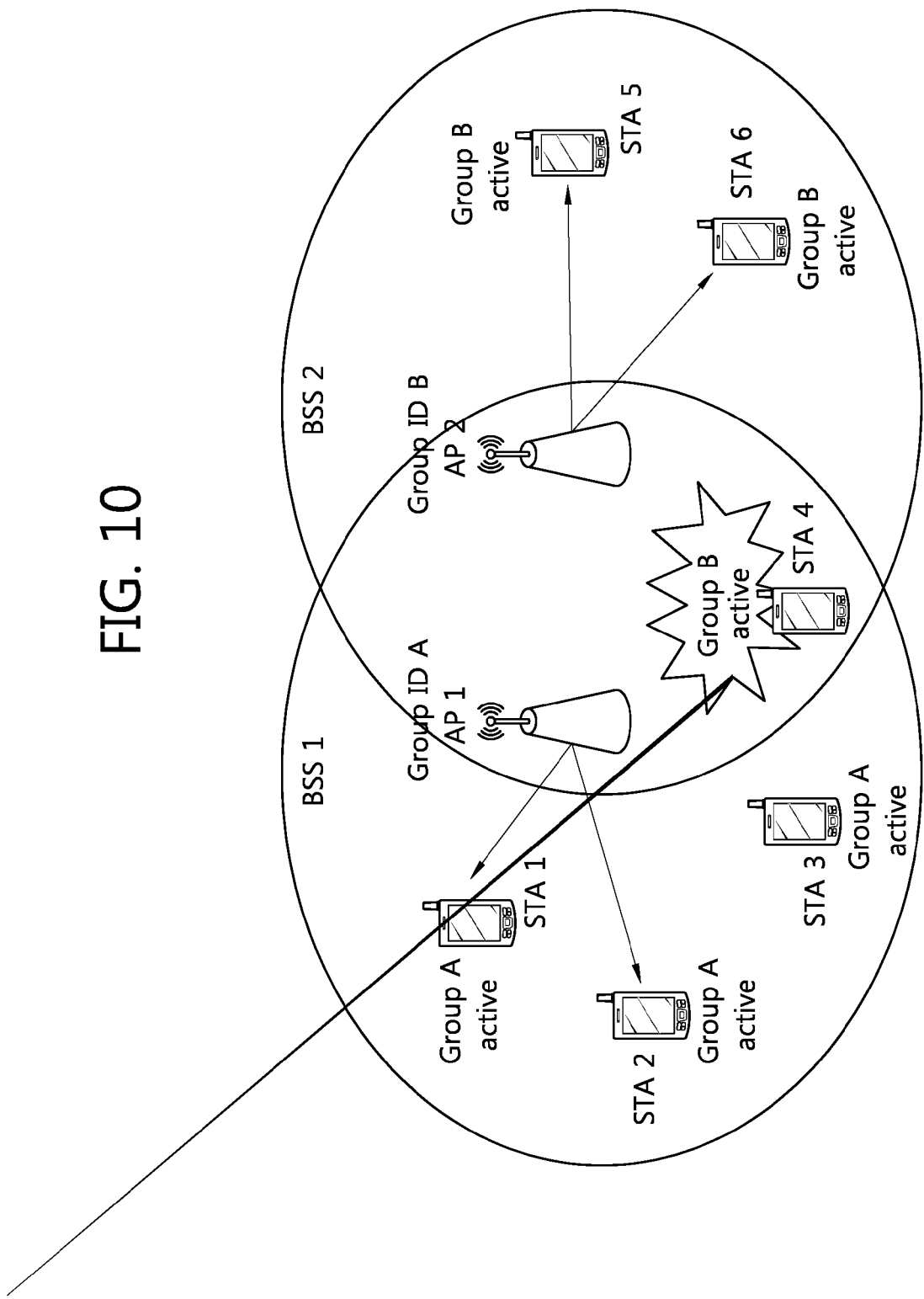
FIG. 10 illustrates a problem that may be generated in an OBSS environment.

FIG. 10 illustrates a problem that may be generated in an OBSS environment.

In the example of FIG. 10, an AP 1 of a BSS 1 has allocated a Group ID A to an STA 1 and an STA 2 and a Group ID B to an STA 3 and an STA 4. Since the AP 1 transmits data to the STA 1 and the STA 2 to which the Group ID A has been allocated, the STA 3 and the STA 4 have to switch to the sleep mode. However, since the STA 4 is operated in the area in which the BSAs of the BSS 1 and a BSS 2 overlap with each other, the STA 4 may not switch to the sleep mode. Since the AP 2 of the BSS 2 transmits data to an STA 5 and an STA 6 to which the Group ID B has been allocated, the STA 4 continues to be operated in the awake mode although the data will not be transmitted to the STA 4.

In order to reduce such unnecessary power consumption, there is proposed a method of including a BSS ID in a VHT-SIG field. To include the BSS ID of 48 bits in the VHT-SIG field without change may be realistically difficult because of a limit to the bit fields of the VHT-SIG field. According to an embodiment of the present invention, in order to solve the problem, CRC masking may be used, or BSS ID information that may replace the BSS ID may be included in the VHT-SIG field. The BSS ID information that may replace the BSS ID is for identifying BSSs constituting an OBSS. The BSS ID information may be composed of about 2 or 3 bits by taking the number of APs which can produce an OBSS environment into consideration. The BSS ID information that may replace the BSS ID is hereinafter referred to as a local AP ID. The local AP ID can identify BSSs by using smaller bits than the BSS ID.

Figure 11:
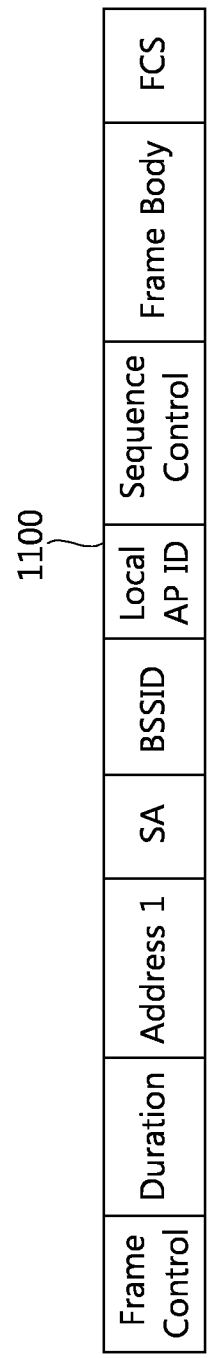
FIG. 11 shows an example of the frame format of a beacon frame including a local AP ID according to an embodiment of the present invention.

The local AP ID, together with the BSS ID, may be transmitted though a beacon frame which is periodically transmitted by an AP. FIG. 11 shows an example of the frame format of a beacon frame, including a local AP ID 1100, according to an embodiment of the present invention.

The local AP ID may be obtained by hashing a BSS ID and used between all STAs and an AP through an agreement. As an example in which the local AP ID is obtained by hashing the BSS ID, only some of the bit fields of the BSS ID may be fetched and used as the local AP ID.

The above problem generated in the OBSS environment may be solved by including a BSS ID or a local AP ID in a VHT-SIG field in addition to a group ID such that an STA having another group ID primarily switches to the sleep mode using the group ID and an STA belonging to another BSS secondarily switches to the sleep mode using the BSS ID or the local AP ID. Here, the group ID may be included in a VHT-SIG1 field and transmitted, and the BSS ID (or local AP ID) may be included in a VHT-SIG2 field and transmitted.

Figure 12:
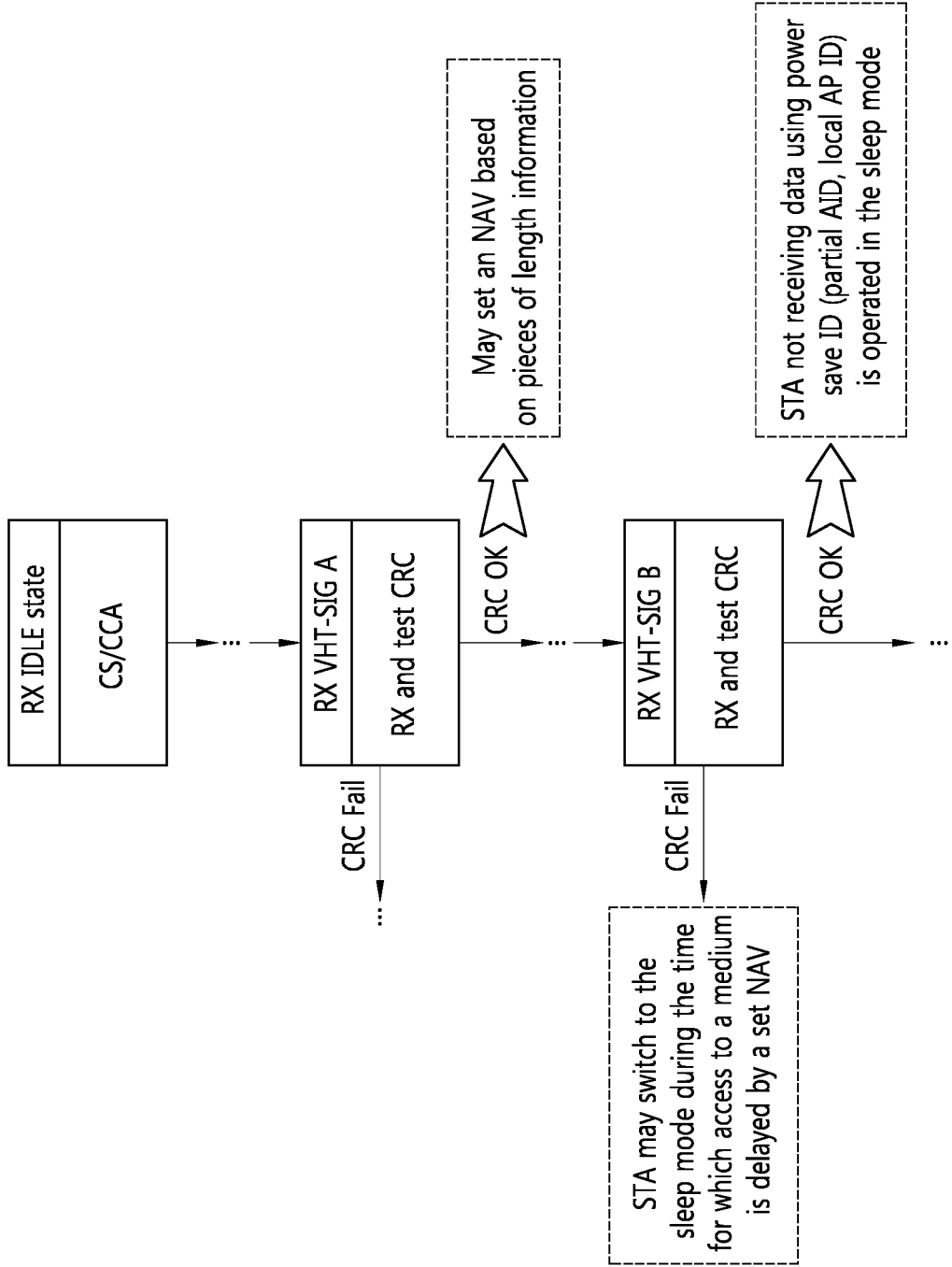
FIG. 12 shows a radio frame reception algorithm for reducing the power consumption of an STA.

FIG. 12 shows a radio frame reception algorithm for reducing power consumption of an STA.

If error is not generated as a result of a CRC after detecting and decoding a VHT-SIG1 field (CRC OK), an STA may obtain information about a VHT length. If information about whether to switch to the sleep mode is included, an STA which does not receive data may switch to the sleep mode (for example, in UL transmission). If error is not generated as a result of a CRC after detecting and decoding a VHT-SIG2 field (CRC OK), STAs which do not receive data may switch to the sleep mode. If error is found as a result of a CRC for the VHT-SIG2 field (CRC fail), the STA may set a Network Allocation Vector (NAV) because it has already obtained the length information from the VHT-SIG1 and may be operated in the sleep mode during the period in which the NAV is set.

In accordance with the embodiments of the present invention described with reference to FIGS. 9 and 10, the AID, the partial AID, the BSS ID, and the local AP ID may be included in the VHT-SIG1 field or the VHT-SIG2 field and then transmitted. According to another method, the AID, the partial AID, the BSS ID, and the local AP ID may be masked to a CRC included in the VHT-SIG1 field or the VHT-SIG2 field and then transmitted.

Information, indicating STAs that should be operated in the awake mode, may be included in the VHT-SIG1 field. Information indicating a data reception STA that must decode and demodulate data, from among the STAs which are indicated in the VHT-SIG1 field and should be operated in the awake mode, may be included in the VHT-SIG2 field.

Figure 13:
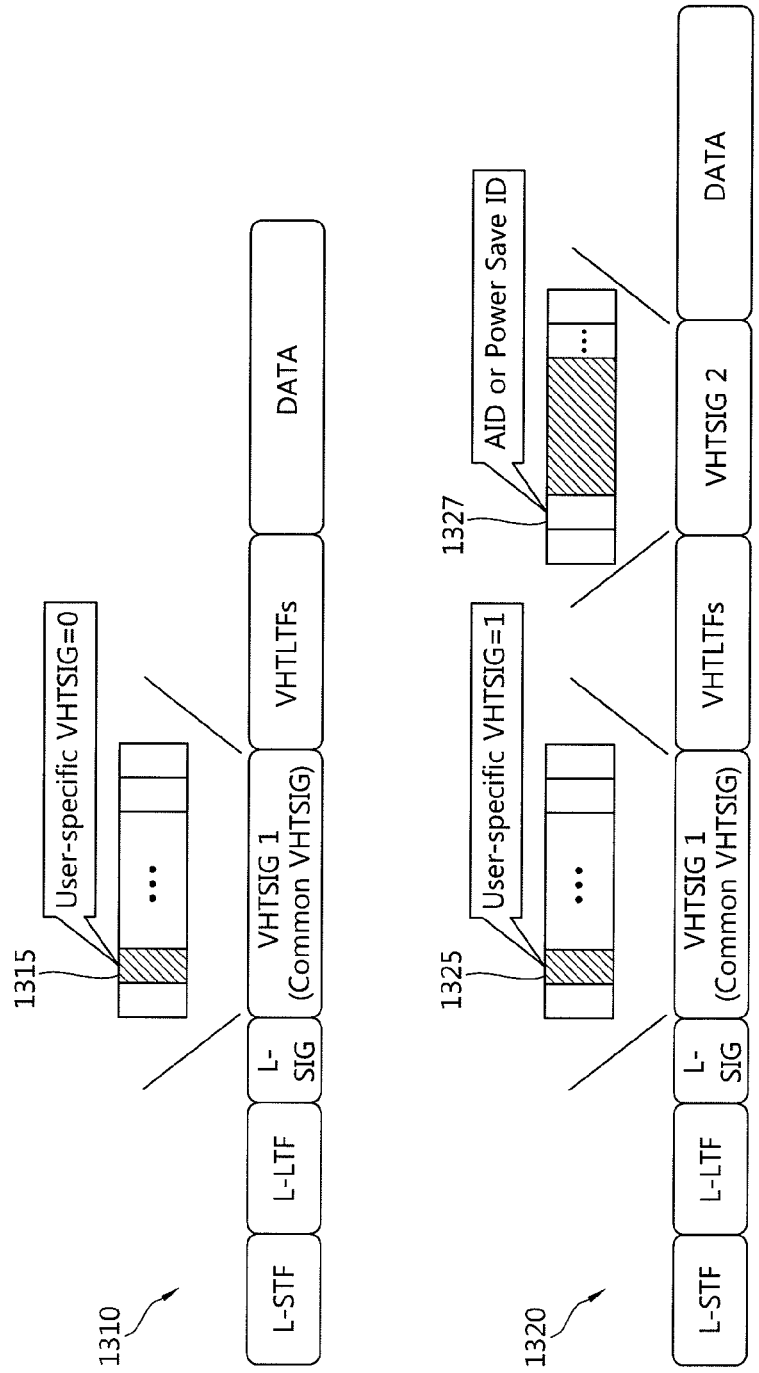
FIG. 13 shows an example of a PLCP frame format that supports SU-MIMO transmission according to an embodiment of the present invention.

FIG. 13 shows an example of a PLCP frame format that supports SU-MIMO transmission according to an embodiment of the present invention.

If all pieces of control information for supporting SU-MIMO transmission can be included in the VHT-SIG1 field of the PLCP frame 900 of FIG. 9, to transmit the VHT-SIG2 field is to transmit unnecessary information, which may serve as overhead. Accordingly, in SU-MIMO transmission, the VHT-SIG2 field may be omitted.

If additional information needs to be transmitted in order to efficiently support SU-MIMO transmission in various environments, however, the VHT-SIG2 field may be transmitted without being omitted, but additional information to be transmitted may be included in the VHT-SIG2 field.

In FIG. 13, a first PLCP frame 1310 shows an example in which all pieces of control information necessary for SU-MIMO transmission are included in a VHT-SIG1 field and transmitted, but a VHT-SIG2 field is omitted. Furthermore, a second PLCP frame 1320 shows an example in which control information necessary for SU-MIMO transmission is included in a VHT-SIG1 field and transmitted, and information that is not transmitted through the VHT-SIG1 field owing to the insufficient bit fields of the VHT-SIG1 field or information that may be additionally supplied is included in the VHT-SIG2 field and transmitted.

If whether to include the VHT-SIG2 field in SU-MIMO transmission is optional as in the example of FIG. 13, information, indicating whether the PLCP frame includes the VHT-SIG2 field, has to be transmitted. In the example of FIG. 13, a user-specific VHT-SIG bit 1315 and a user-specific VHT-SIG bit 1325, included in the VHT-SIG1 field and transmitted, indicate whether the VHT-SIG2 field is included in the PLCP frame. The user-specific VHT-SIG bit 1325 included in the VHT-SIG1 field of the second PLCP frame 1320 is set to 1 in order to inform that the PLCP frame 1320 includes the VHT-SIG2 field. An AID or a power save ID 1327, included in the VHT-SIG2 field of the second PLCP frame 1320, shows an example of supplementary information which may be included in the VHT-SIG2 field and transmitted.

The frame configuration and the transmission method according to the embodiment of FIG. 13 may be applied to MU-MIMO transmission in a limited situation. When MU-MIMO transmission is supported, control information about each of destination STAs according to the MU-MIMO transmission is included in the VHT-SIG2 field. The control information included in the VHT-SIG2 field may be an MCS of data which is transmitted to each STA. If a channel environment has been stabilized, an MCS used whenever a data frame is transmitted will not be changed. If information included in the VHT-SIG2 field and transmitted is not changed for a given period, the user-specific VHT-SIG bit may be set to 0, and a PLCP frame including only the VHT-SIG1 field may be transmitted. That is, even in MU-MIMO transmission, if information to be transmitted through the VHT-SIG2 field is not changed or maintained identically for a given period, relevant information may be transmitted using the format of the PLCP frame 1310 of FIG. 13, as in SU-MIMO transmission, during the period in which the relevant information is not changed after it is first transmitted.

The embodiment described with reference to FIG. 7 is an example of the method of including information (i.e., the non-overhearing bit), indicating whether STAs other than a transmission STA will continue overhearing, in the VHT-SIG1 field and transmitting the information, in the case of UL transmission. Furthermore, in the embodiment described with reference to FIG. 9, it has been described that the partial AID of N bits may be included in the VHT-SIG1 field as information for identifying a target STA and then transmitted. According to another embodiment of the present invention, when the partial AID of N bits is included in the VHT-SIG1 field and transmitted, the transmission of the information, indicating whether other STAs will continue overhearing described with reference to FIG. 7, may be replaced with the partial AID of N bits. In other words, the transmission of the non-overhearing bit may be replaced with the transmission of the partial AID of N bits.

If the partial AID can be represented by N bits or an M number of states comparable to the N bits, some of the states may be used for the same purpose as the non-overhearing bit. If some of an M number of the states is allocated to indicate that an STA performs transmission to an AP, there is an advantage in that STAs now hearing a relevant PLCP may switch to the power save mode in a bundle because they are not an AP.

Furthermore, in the case where an AP transmits data to STAs in broadcast, all the STAs have to receive the data. Some of an M number of the states may be allocated and used to indicate that an AP or a certain STA performs broadcast transmission in which data is transmitted to a number of unspecific STAs or APs.

In an alternative embodiment, a bit or a field, including information informing broadcasted data or information informing that the target of reception is an AP, may be included in a PLCP header and transmitted.

A reception target indicator indicative of the target of reception may be included in a PLCP header (e.g., a VHT-SIG field) so that an STA or an AP (i.e., not the subject of reception) may switch to the sleep mode. Table 2 shows an example in which reception target indicators are set.

TABLE 2

| RECEPTION TARGET INDICATOR | SUBJECT OF RECEPTION |
| --- | --- |
| 0 | STA |
| 1 | AP |
| 2 | Broadcast |

If a reception target indicator indicating the target of reception is included in a VHT-SIG field and additional information aiming to reduce power is included in a PLCP header, the additional information aiming to reduce power may be differently interpreted according to the reception target indicator. For example, if the object indicated by a reception target indicator is an AP, additional information aiming to reduce power may be interpreted as information relating to the AP. If the object indicated by a reception target indicator is an STA, additional information aiming to reduce power may be interpreted as information relating to the STA. For example, if a reception target indicator indicates the target of reception as an STA and an AID or a partial AID is transmitted as additional information aiming to reduce power, an STA that has received the AID or the partial AID interprets the AID or the partial AID, transmitted as the additional information, as the AID or partial AID of an STA not an AP. Table 3 shows another example in which reception target indicators are set.

TABLE 3

| RECEPTION TARGET INDICATOR | SUBJECT OF RECEPTION |
| --- | --- |
| 0 | STA |
| 1 | AP |
| 2 | Broadcast for STA |
| 3 | Broadcast for AP |

Meanwhile, an AP is a fixed device, and power efficiency for the AP has been less taken into consideration. If DL data to be transmitted to an STA exists as in FIG. 14, an AP transmits the DL data to the STA when the STA is determined to be operated in the awake mode. For example, when an AP informs that there is data to be transmitted to an STA through a beacon frame, the STA informs the AP that the STA is operated in the awake mode by transmitting a trigger to the AP and then receives the data from the AP. In the case where there is no further data to be transmitted, if the AP transmits an End of Service period (EOSP) to the STA, the STA is operated again in the sleep mode. Even though there is no data to be transmitted to the STA, the AP periodically transmits a beacon frame for the purpose of an operation, such as an operation of associating with a new STA. If there is UL data to be transmitted to an AP, an STA can transmit the UL data to the AP when a channel is determined to be idle according to a CSMA/CA rule because the AP is always operated in the awake mode.

However, as mobile Internet devices, such as smart phones, Netbooks, and MIDs, are recently rapidly popularized, service satisfactory to consumers is not supported using fixed APs, such as the existing wired network or Wi-Fi at home. For this reason, a mobile AP that allows consumers to freely enjoy wireless service anywhere has been in the spotlight. A mobile AP needs to take power consumption efficiency into consideration because it is operated using limited power as in an STA. Accordingly, it is necessary to introduce technology for a power reduction method for an AP.

Figure 14:
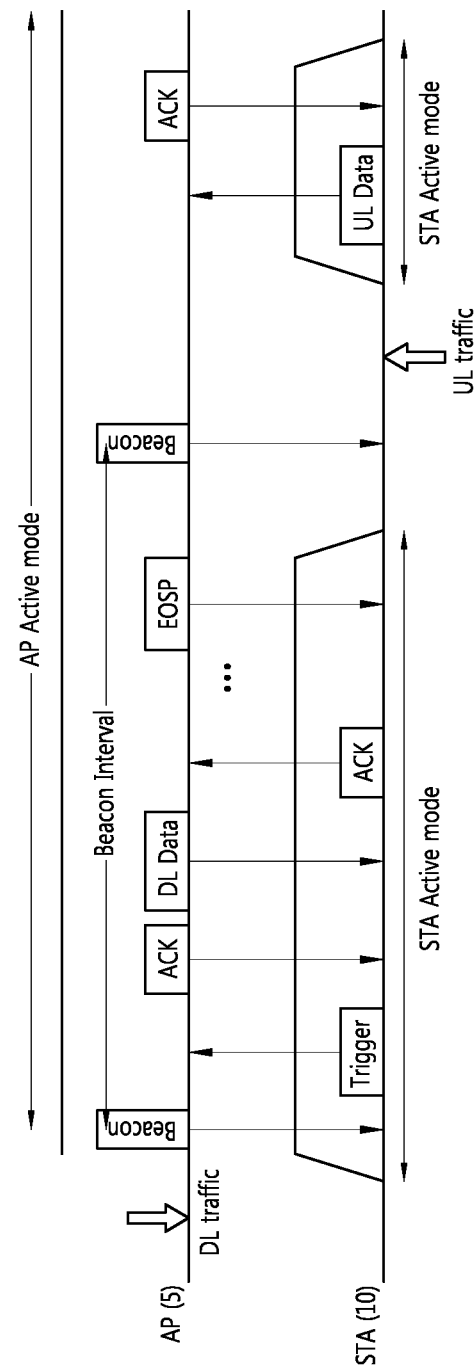
FIG. 14 shows an example of a method of an AP transmitting a frame when an STA is operated in a PS mode.
Figure 15:
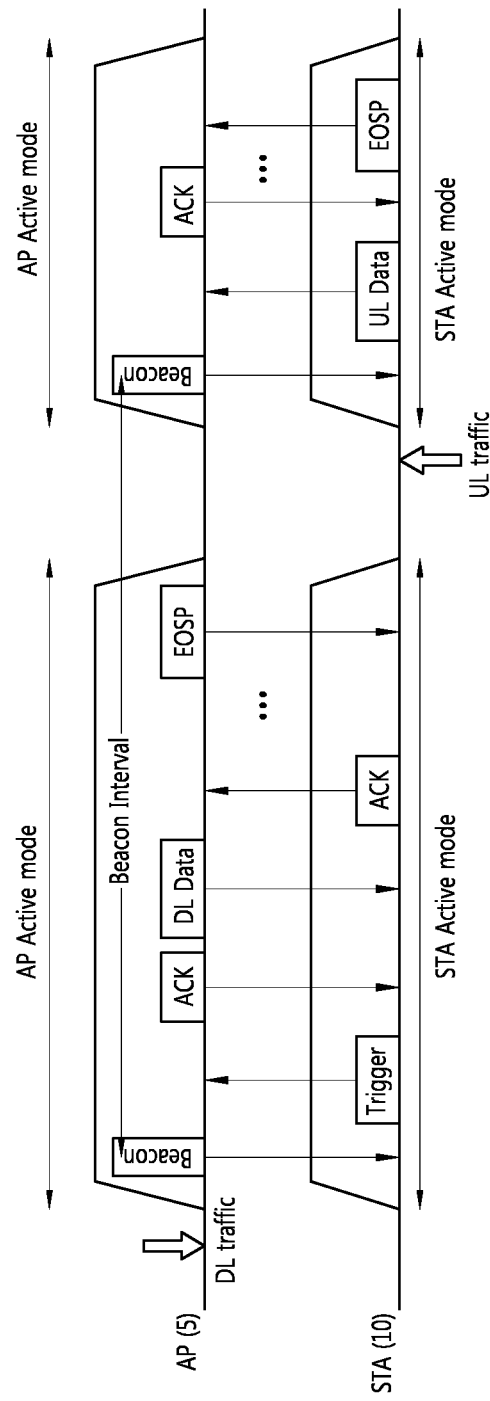
FIG. 15 shows a method of an AP transmitting a frame according to an embodiment of the present invention.

The existing AP is always operated in an active mode. According to an embodiment of the present invention, an AP may place a limitation on the period in which an STA transmits UL data to the AP in order to reduce unnecessary power consumption of the AP, occurring because the AP is always operated in the active mode. In other words, the AP may be operated in the PS mode and may be switched between the awake mode and the sleep mode. If an STA has UL data to be transmitted to an AP, the STA transmits the UL data, buffered when the AP is in the awake mode, to the AP. The AP has to transmit a management frame for informing the STA that the AP is operated in the awake mode. FIG. 15 shows an example of the transmission of the management frame. In the example of FIG. 14, the AP (5) uses a beacon frame to inform that it is operated in the awake mode. The AP (5) may be operated in the awake mode in synchronism with the cycle of a beacon interval because it periodically broadcasts the beacon frame. That is, the STA (10) may know that the AP (5) is operated in the awake mode by receiving the beacon frame and, at this time, may transmit buffered UL data to the AP (5).

If the AP (5) has buffered DL data, the AP (5) informs the STA (10) of the buffered DL data through a beacon frame. The STA (10) being operated in the awake mode transmits a trigger frame and receives the DL data from the AP (5). Meanwhile, if the STA (10) has buffered UL data, the STA (10) may transmit the UL data to the AP (5) after checking that the AP (5) is operated in the awake mode. For example, the STA (10) which has read the beacon frame of the AP (5) may know that the AP (5) is operated in the awake mode. After transmitting the beacon frame, the AP (5) maintains the awake mode for a given period. If there is no UL data transmission, the AP (5) may enter the sleep mode in order to increase the power consumption efficiency of the AP (5). Meanwhile, in the case where the AP (5) has buffered DL data to be transmitted the STA (10) and the STA (10) has buffered UL data to be transmitted to the AP (5), the subject of data transmission is determined through a CSMA/CA rule. In order to receive DL data according to a backoff interval, the STA (10) may transmit a trigger frame to the AP (5) or UL data to the AP (5).

Figure 16:
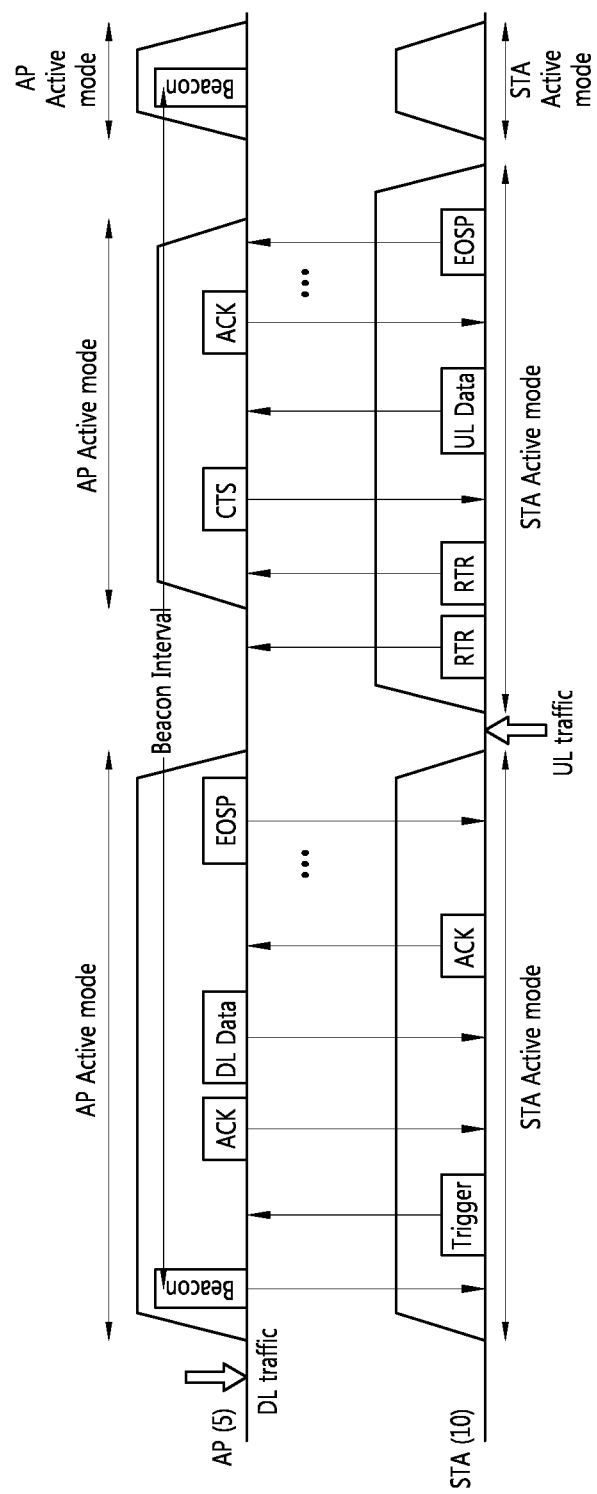
FIG. 16 shows an example in which an AP and an STA are operated in order to reduce the power consumption of the AP according to an embodiment of the present invention.

FIG. 16 shows an example in which an AP and an STA are operated in order to reduce the power consumption of the AP according to an embodiment of the present invention.

In order to increase the power efficiency of an AP, the cycle of a beacon frame transmitted may be increased. In this case, the period in which the AP can transmit DL data to an STA is reduced. Furthermore, transmission delay of UL data may be increased owing to the increased cycle of the beacon frame. In an embodiment of the present invention, in order to improve the above problem, the buffered UL data of an STA may be transmitted between DL beacon frames, as in the example of FIG. 16. An STA (10) transmits an RTS frame to an AP (5) because the STA (10) does not know whether the AP (5) is operated in the awake mode without a beacon frame transmitted by the AP (5). When a CTS frame is received from the AP (5) in response to the RTS frame, the STA (10) transmits UL data to the AP (5). Here, the AP (5) is periodically operated in the awake mode in other times when the beacon frame is transmitted, but does not transmit the beacon frame. Accordingly, the power consumption efficiency of an AP can be increased and the delay of data transmission can be reduced, as compared with the embodiment described with reference to FIG. 14.

Figure 17:
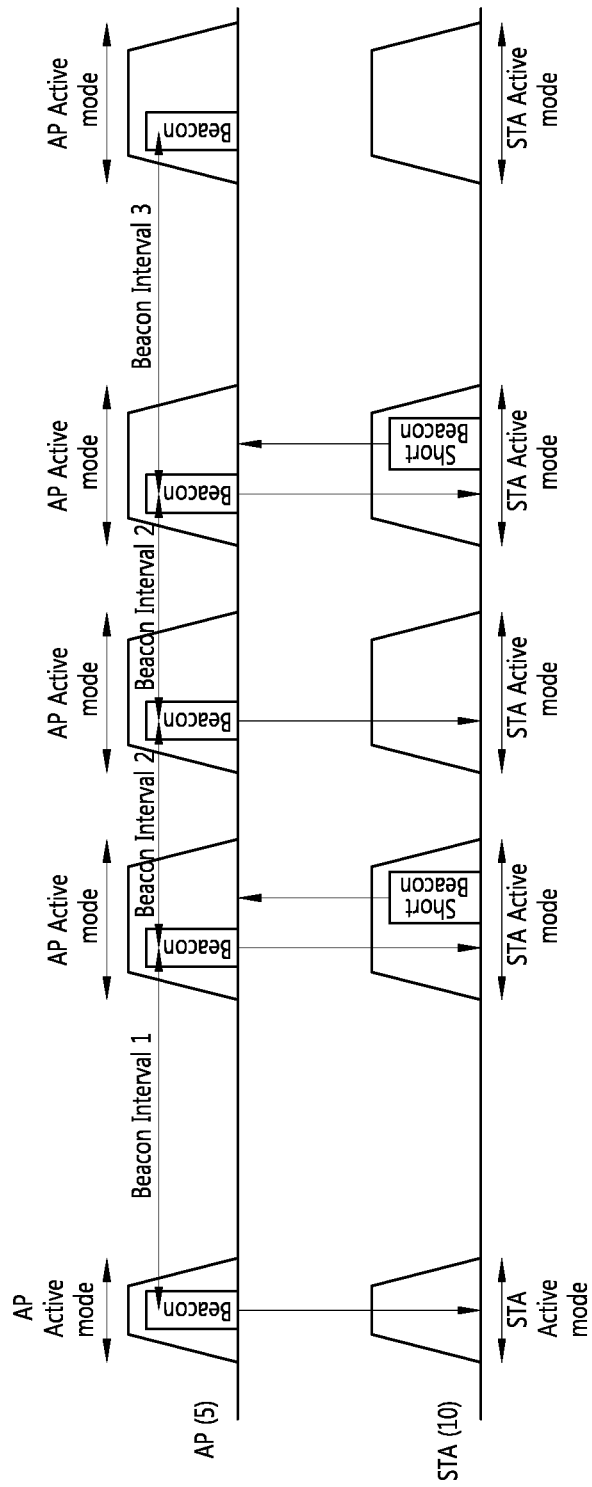
FIG. 17 shows an example in which an AP and an STA are operated in order to reduce the power consumption of the AP according to another embodiment of the present invention.

FIG. 17 shows an example in which an AP and an STA are operated in order to reduce the power consumption of the AP according to another embodiment of the present invention.

In the embodiment of FIG. 16, the STA (10) can transmit UL data to the AP (5) after checking whether the AP (5) is operated in the awake mode through the exchange of the RTS frame and the CTS frame with the AP (5). Here, if the AP (5) is not operated in the awake mode, the STA (10) may consume unnecessary power by unilaterally transmitting only the RTS frame. However, if the STA (10) provides the AP (5) with information about a point of time at which the STA (10) is operated in the awake mode, the AP (5) can be operated in the awake mode in synchronism with the time when the STA (10) is awaken. In the example of FIG. 17, it is assumed that an AP (5) is operated in the awake mode at a beacon interval 1. An STA (10) transmits a short beacon frame to the AP (5) when the AP (5) is in the awake mode. Here, the short beacon frame includes information about when the STA (10) will become the awake mode. After reading the short beacon frame, the AP (5) can be operated in the awake mode in synchronism with the period in which the STA (10) is awaken. That is, the AP (5) may adjust the beacon interval 1 to a beacon interval 2 according to the status of the STA (10).

If a plurality of STAs is associated with an AP, the AP may be operated in the PS mode based on information transmitted in a short beacon frame from among beacon frames transmitted by the STAs.

Hereinafter, pieces of information that may be included in the VHTSIG1 field and the VHTSIG2 field in order to implement the various embodiments are described below with reference to various examples.

TABLE 4

| SU-MIMO VHTSIG1 Field (max 48 bits) |
| --- |
| VHT length |
| MU indication |
| # of SS per user |
| CBW |
| Smoothing |
| Not sounding |
| STBC |
| FEC coding |
| Short GI |
| Resolvable indication |
| Non-overhearing |
| MCS |
| CRC |
| Tail bit |

TABLE 5

| MU-MIMO VHTSIG1 Field (max 48 bits) | MU-MIMO VHTSIG2 Field (max 26 bits) |
| --- | --- |
| VHT length | |
| MU indication | |
| # of SS per user | |
| (CBW) | (CBW) |
| | STBC |
| | FEC coding |
| | Short GI |
| resolvable indication | |
| Group ID | MCS |
| CRC | CRC |
| Tail bit | Tail bit |

Table 4 shows an example of the pieces of information that may be included in the VHTSIG field of a PLCP frame which supports SU-MIMO transmission, and Table 5 shows an example of the pieces of information that may be included in the VHTSIG field of a PLCP frame which supports MU-MIMO transmission.

If an MU indication indicates SU-MIMO transmission, an STA can obtain all pieces of information, related to data transmission, from VHTSIGA, and thus an AP does not transmit the VHTSIG2 field. If an MU indication indicates MU-MIMO transmission, an AP transmits fields, such as a VHT length, an MU indication, and a stream number indication all of which must be read by paired target STAs of MU-MIMO, through the VHTSIG1 field and transmits the remaining pieces of information other than the fields through the VHTSIG2 field as control information for each of the paired STAs. As in Table 5, a field value in which information transmitted through the VHTSIG1 field is moved to the VHTSIG2 field in Table 4 includes a stream indication or a group ID necessary for MU-MIMO transmission and it may be interpreted again in the VHTSIG1 field.

In SU-MIMO transmission, in order to increase the power reduction efficiency of an STA, the power save ID (or, partial AID or local AP ID) of the above embodiment may be transmitted using the VHT length field in the SU-MIMO VHTSIG of Table 4. In this case, the VHT duration may be transmitted through an L-SIG field.

In MU-MIMO transmission, in order to increase the power reduction efficiency of an STA in an OBSS environment, the local AP ID may be included in the VHTSIG1 field or the VHTSIG2 field. The local AP ID may be relatively easily included in the VHTSIG2 field and transmitted because the VHTSIG2 field has marginal space. However, if the local AP ID is included in the VHTSIG1 field, an STA can switch to the sleep mode and operate from VHTSTF. In this case, it is inefficient as compared with the case where the STA is operated in the sleep mode from the VHTSIG2 field. The VHT length or the CRC field of the VHTSIG1 field may be interpreted as the local AP ID and then used.

Even in MU-MIMO transmission, when an AP transmits data to an STA, an indicator, indicating whether the VHTSIG2 field is included in the VHTSIG1 field, may be included and transmitted in order not to transmit the VHTSIG2 field when the information of the VHTSIG2 field is not changed.

TABLE 6

| SU-MIMO VHTSIG1 Field (max 48 bits) |
| --- |
| VHT length |
| MU indication |
| # of SS per user |
| CBW |
| smoothing |
| Not sounding |
| STBC |
| FEC coding |
| Short GI |
| resolvable indication |
| non-overhearing |
| MCS |
| CRC |
| Tail bit |

TABLE 7

| MU-MIMO VHTSIG1 Field (max 48 bits) | MU-MIMO VHTSIG2 Field (max 26 bits) |
| --- | --- |
| VHT length | |
| MU indication | |
| # of SS per user | |
| (CBW) | (CBW) |
| STBC | |
| FEC coding | |
| Short GI | |
| resolvable indication | |
| | PS ID |
| Group ID | MCS |
| CRC | CRC |
| Tail bit | Tail bit |

In Table 5, fields, such as STBC, FEC coding, and short GI, are transmitted through the VHTSIG2 field. Here, in terms of the structure of a PLCP frame, delay may be generated because information of the VHTSIG2 field is required in decoding data. That is, as in Table 7, some or all of the fields of STBC, FEC coding, and short GI have to be transmitted through the VHTSIG1 field. Here, if an MU indication indicates MU-MIMO transmission, an AP may leave fields, such as a VHT length, an MU indication, and a stream number indication all of which must be read by paired MU-MIMO target STAs, in the VHTSIG1 field, leave some or all of the STBC, FEC coding, and short GI fields in the VHTSIG1 field for convenience of implementations, and transmit the remaining fields through the VHTSIG2 field. In Table 6, a field moved to the VHTSIGB of Table 7 may be interpreted as a stream indication or a Group ID for MU-MIMO transmission in the VHTSIG1 field and then used. Here, the CRC field of the VHTSIG1 field may be used for MU-MIMO transmission, if needed.

In MU-MIMO transmission, in order to increase the power reduction efficiency of an STA in an OBSS environment, a local AP ID may be included in the VHTSIG1 field or the VHTSIG2 field. The local AP ID may be relatively easily included in the VHTSIG2 field and transmitted because the VHTSIG2 field has marginal space. However, if the local AP ID is included in the VHTSIG1 field, an STA can switch to the sleep mode and operate from VHTSTF. In this case, it is inefficient as compared with the case where the STA is operated in the sleep mode from the VHTSIG2 field. The VHT length or the CRC field of the VHTSIG1 field may be interpreted as the local AP ID and then used.

Even in MU-MIMO transmission, when an AP transmits data to an STA, an indicator, indicating whether the VHTSIG2 field is included in the VHTSIG1 field, may be included and transmitted in order not to transmit the VHTSIG2 field when the information of the VHTSIG2 field is not changed.

TABLE 8

| SU-MIMO VHTSIG1 Field (max 48 bits) | SU-MIMO VHTSIG2 Field (max 26 bits) |
| --- | --- |
| VHT length | |
| MU indication | |
| # of SS per user | |
| CBW | |
| smoothing | |
| Not sounding | |
| STBC | |
| FEC coding | |
| Short GI | |
| Resolvable indication | |
| SIGB indication | |

TABLE 8-continued

| SU-MIMO VHTSIG1 Field (max 48 bits) | SU-MIMO VHTSIG2 Field (max 26 bits) |
|---|---|
| MCS<br>CRC<br>Tail bit | PS ID<br>CRC<br>Tail bit |

TABLE 9

| MU-MIMO VHTSIG1 Field (max 48 bits) | MU-MIMO VHTSIG2 Field (max 26 bits) |
|---|---|
| VHT length<br>MU indication<br># of SS per user<br>(CBW)<br><br><br><br>Resolvable indication<br>Group ID<br>CRC<br>Tail bit | <br><br><br>(CBW)<br>STBC<br>FEC coding<br>Short GI<br><br>MCS<br>CRC<br>Tail bit |

TABLE 10

| SU-MIMO VHTSIG1 Field (max 48 bits) | SU-MIMO VHTSIG2 Field (max 26 bits) |
|---|---|
| VHT length<br>MU indication<br># of SS per user<br>CBW<br>smoothing<br>Not sounding<br>STBC<br>FEC coding<br>Short GI<br>Resolvable indication<br>SIGB indication<br>MCS<br>CRC<br>Tail bit | <br><br><br><br><br><br><br><br><br><br><br>PS ID<br>CRC<br>Tail bit |

TABLE 11

| MU-MIMO VHTSIG1 Field (max 48 bits) | MU-MIMO VHTSIG2 Field (max 26 bits) |
|---|---|
| VHT length<br>MU indication<br># of SS per user<br>(CBW)<br>STBC<br>FEC coding<br>Short GI<br>Resolvable indication<br><br>Group ID<br>CRC<br>Tail bit | <br><br><br>(CBW)<br><br><br><br><br>PS ID<br>MCS<br>CRC<br>Tail bit |

TABLE 12

| SU-MIMO VHTSIG1 Field (max 48 bits) | SU-MIMO VHTSIG2 Field (max 26 bits) |
|---|---|
| VHT length<br>MU indication<br># of SS per user<br>CBW | |

TABLE 12-continued

| SU-MIMO VHTSIG1 Field (max 48 bits) | SU-MIMO VHTSIG2 Field (max 26 bits) |
|---|---|
| smoothing<br>Not sounding<br><br><br><br>Resolvable indication<br>SIGB indication<br>MCS<br>CRC<br>Tail bit | <br><br>STBC<br>FEC coding<br>Short GI<br><br><br>PS ID<br>CRC<br>Tail bit |

TABLE 13

| MU-MIMO VHTSIG1 Field (max 48 bits) | MU-MIMO VHTSIG2 Field (max 26 bits) |
|---|---|
| VHT length<br>MU indication<br># of SS per user<br>(CBW)<br><br><br><br>Resolvable indication<br>Group ID<br>CRC<br>Tail bit | <br><br><br>(CBW)<br>STBC<br>FEC coding<br>Short GI<br><br>MCS<br>CRC<br>Tail bit |

TABLE 14

| SU-MIMO VHTSIG1 Field (max 48 bits) | SU-MIMO VHTSIG2 Field (max 26 bits) |
|---|---|
| VHT length<br>MU indication<br># of SS per user<br>CBW<br>smoothing<br>Not sounding<br><br><br><br>resolvable indication<br>SIGB indication<br>MCS<br>CRC<br>Tail bit | <br><br><br><br><br><br>STBC<br>FEC coding<br>Short GI<br><br><br>PS ID<br>CRC<br>Tail bit |

TABLE 15

| MU-MIMO VHTSIG1 Field (max 48 bits) | MU-MIMO VHTSIG2 Field (max 26 bits) |
|---|---|
| VHT length<br>MU indication<br># of SS per user<br>(CBW)<br>STBC<br>FEC coding<br>Short GI<br>Resolvable indication<br><br>Group ID<br>CRC<br>Tail bit | <br><br><br>(CBW)<br><br><br><br><br>PS ID<br>MCS<br>CRC<br>Tail bit |

TABLE 16

| SU-MIMO VHTSIG1 Field (max 48 bits) | SU-MIMO VHTSIG2 Field (max 26 bits) |
|---|---|
| VHT length | |
| MU indication | |
| # of SS per user | |
| CBW | |
| smoothing | |
| Not sounding | |
| STBC | |
| FEC coding | |
| Short GI | |
| Resolvable indication | |
| SIGB indication | |
| PS ID | MCS |
| CRC | CRC |
| Tail bit | Tail bit |

TABLE 17

| MU-MIMO VHTSIG1 Field (max 48 bits) | MU-MIMO VHTSIG2 Field (max 26 bits) |
|---|---|
| VHT length | |
| MU indication | |
| # of SS per user | |
| (CBW) | (CBW) |
| | STBC |
| | FEC coding |
| | Short GI |
| Resolvable indication | |
| Group ID | MCS |
| CRC | CRC |
| Tail bit | Tail bit |

TABLE 18

| SU-MIMO VHTSIG1 Field (max 48 bits) | SU-MIMO VHTSIG2 Field (max 26 bits) |
|---|---|
| VHT length | |
| MU indication | |
| # of SS per user | |
| CBW | |
| smoothing | |
| Not sounding | |
| STBC | |
| FEC coding | |
| Short GI | |
| Resolvable indication | |
| SIGB indication | |
| PS ID | MCS |
| CRC | CRC |
| Tail bit | Tail bit |

TABLE 19

| MU-MIMO VHTSIG1 Field (max 48 bits) | MU-MIMO VHTSIG2 Field (max 26 bits) |
|---|---|
| VHT length | |
| MU indication | |
| # of SS per user | |
| (CBW) | (CBW) |
| STBC | |
| FEC coding | |
| Short GI | |
| Resolvable indication | |
| | PS ID |
| Group ID | MCS |
| CRC | CRC |
| Tail bit | Tail bit |

TABLE 20

| SU-MIMO VHTSIG1 Field (max 48 bits) | SU-MIMO VHTSIG2 Field (max 26 bits) |
|---|---|
| VHT length | |
| MU indication | |
| # of SS per user | |
| CBW | |
| smoothing | |
| Not sounding | |
| | STBC |
| | FEC coding |
| | Short GI |
| resolvable indication | |
| SIGB indication | |
| PS ID | MCS |
| CRC | CRC |
| Tail bit | Tail bit |

TABLE 21

| MU-MIMO VHTSIG1 Field (max 48 bits) | MU-MIMO VHTSIG2 Field (max 26 bits) |
|---|---|
| VHT length | |
| MU indication | |
| # of SS per user | |
| (CBW) | (CBW) |
| | STBC |
| | FEC coding |
| | Short GI |
| resolvable indication | |
| Group ID | MCS |
| CRC | CRC |
| Tail bit | Tail bit |

TABLE 22

| SU-MIMO VHTSIG1 Field (max 48 bits) | SU-MIMO VHTSIG2 Field (max 26 bits) |
|---|---|
| VHT length | |
| MU indication | |
| # of SS per user | |
| CBW | |
| smoothing | |
| Not sounding | |
| | STBC |
| | FEC coding |
| | Short GI |
| Resolvable indication | |
| SIGB indication | |
| PS ID | MCS |
| CRC | CRC |
| Tail bit | Tail bit |

TABLE 23

| MU-MIMO VHTSIG1 Field (max 48 bits) | MU-MIMO VHTSIG2 Field (max 26 bits) |
|---|---|
| VHT length | |
| MU indication | |
| # of SS per user | |
| (CBW) | (CBW) |
| STBC | |
| FEC coding | |
| Short GI | |
| Resolvable indication | |
| | PS ID |
| Group ID | MCS |
| CRC | CRC |
| Tail bit | Tail bit |

TABLE 24

| SU-MIMO VHTSIG1 Field (max 48 bits) | SU-MIMO VHTSIG2 Field (max 26 bits) |
|---|---|
| VHT length | |
| MU indication | |
| # of SS per user | |
| CBW | |
| smoothing | |
| Not sounding | |
| STBC | |
| FEC coding | |
| Short GI | |
| resolvable indication | |
| SIGB indication | PS ID |
| | MCS |
| CRC | CRC |
| Tail bit | Tail bit |

TABLE 25

| MU-MIMO VHTSIG1 Field (max 48 bits) | MU-MIMO VHTSIG2 Field (max 26 bits) |
|---|---|
| VHT length | |
| MU indication | |
| # of SS per user | |
| (CBW) | (CBW) |
| | STBC |
| | FEC coding |
| | Short GI |
| resolvable indication | |
| Group ID | MCS |
| CRC | CRC |
| Tail bit | Tail bit |

TABLE 26

| SU-MIMO VHTSIG1 Field (max 48 bits) | SU-MIMO VHTSIG2 Field (max 26 bits) |
|---|---|
| VHT length | |
| MU indication | |
| # of SS per user | |
| CBW | |
| smoothing | |
| Not sounding | |
| STBC | |
| FEC coding | |
| Short GI | |
| Resolvable indication | |
| SIGB indication | PS ID |
| | MCS |
| CRC | CRC |
| Tail bit | Tail bit |

TABLE 27

| MU-MIMO VHTSIG1 Field (max 48 bits) | MU-MIMO VHTSIG2 Field (max 26 bits) |
|---|---|
| VHT length | |
| MU indication | |
| # of SS per user | |
| (CBW) | (CBW) |
| STBC | |
| FEC coding | |
| Short GI | |
| Resolvable indication | |
| | PS ID |
| Group ID | MCS |
| CRC | CRC |
| Tail bit | Tail bit |

Tables 8 to 27 show examples of pieces of information which may be included in the VHTSIG1 field and the VHTSIG2 field when SU-MIMO transmission and MU-MIMO transmission use the same PLCP frame. Here, the PS ID may be the partial AID or the local AP ID in the various embodiments and may be used to increase the power efficiency of an STA in SU-MIMO transmission.

The following factors in configuring the VHTSIG field may be further taken into consideration. An IEEE 802.11n WLAN system supports Space Time Block Coding (STBC). The IEEE 802.11n WLAN system supports transmission using a maximum of four spatial streams, and a 4 Tx transmission STA (transmitter) has four Space Time Streams (STSs). If 8 Tx transmission STA (transmitter) is supported in order to improve the throughput of a VHT WLAN system, a combination of an STS and a Spatial Stream (SS) may be configured as in Table 28.

TABLE 28

| # of STS | STBC field | # of SS |
|---|---|---|
| 1 | 0 | 1 |
| 2 | 0 | 2 |
| 2 | 1 | 1 |
| 3 | 0 | 3 |
| 3 | 1 | 2 |
| 4 | 0 | 4 |
| 4 | 1 | 3 |
| 4 | 2 | 2 |
| 5 | 0 | 5 |
| 5 | 1 | 4 |
| 5 | 2 | 3 |
| 6 | 0 | 6 |
| 6 | 1 | 6 |
| 6 | 2 | 4 |
| 6 | 3 | 4 |
| 7 | 0 | 7 |
| 7 | 1 | 6 |
| 7 | 2 | 5 |
| 7 | 3 | 4 |
| 8 | 0 | 8 |
| 8 | 1 | 7 |
| 8 | 2 | 6 |
| 8 | 3 | 5 |
| 8 | 4 | 4 |

As can be seen from Table 28, in the case of 4 Tx, the STBC field can be indicated using 2 bits because it needs to represent three states. In the case of 8 Tx, however, the STBC field needs to be represented using at least 3 bits because it can have 5 states. If a VHTSIG field has no room to accommodate them, the number of states that must be represented through the STBC field can be reduced by supporting only states greatly influencing the throughput. For example, if the number of STSs is 8 and the STBC field supports (0,1,2,4) or (0,1,3,4) or (0,2,3,4), the STBC can be supported by using only signaling of 2 bits.

Figure 18:
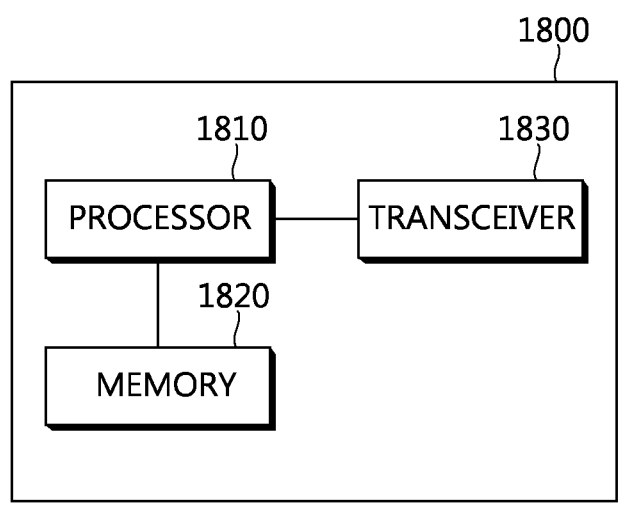
FIG. 18 is a block diagram showing a wireless apparatus in which the embodiment of the present invention is implemented.

FIG. 18 is a block diagram showing a wireless apparatus in which the embodiment of the present invention is implemented. The wireless apparatus 1800 may be an AP or STA.

The wireless apparatus 1800 includes a processor 1810, memory 1820, and a transceiver 1830. The transceiver 1830 transmits and receives a radio signal and has the physical layer of IEEE 802.11 implemented therein. The processor 1810 is functionally connected to the transceiver 1830 and configured to implement the MAC layer and the physical layer of IEEE 802.11. When the processor 1810 processes the operation of an AP in the above methods, the wireless apparatus 1800 becomes the AP. When the processor 1810 processes the operation of an STA in the above methods, the wireless apparatus 1800 becomes the STA. The processor 1810 or the transceiver 1830 or both may include Application-Specific Integrated Circuits (ASICs), other chipsets, logic circuits and/or data processing devices. The memory 1820 may include Read-Only Memory (ROM), Random Access Memory (RAM), flash memory, a memory card, a storage medium, and/or other storage devices. When the embodiment is implemented in software, the above scheme may be implemented using a module (process, function, etc.) for performing the above functions. The module may be stored in the memory 1820 and executed by the processor 1810. The memory 1820 may be external or internal to the processor 1810 and may be coupled to the processor 1820 through various well-known means.

The above embodiments include various forms of illustrations. Although all possible combinations for illustrating the various forms may not be described, a person having ordinary skill in the art will appreciate that other combinations are possible. Accordingly, the present invention may be said to include all other replacements, modifications, and changes which fall within the scope of the invention as defined in the following claims.

The invention claimed is:

1. A method of processing a frame by a mobile station in a wireless local area network system, the method comprising:
   receiving, by the mobile station from an access point, information about a station identifier having a first length and identifying the mobile station;
   receiving, by the mobile station from the access point, a first Physical Layer Convergence Procedure (PLCP) Protocol Data Unit (PPDU) including a first very High Throughput Signal (VHT-SIG) field and a first PLCP Service Data Unit (PSDU); and
   transmitting, by the mobile station to the access point, a second PPDU including a second VHT-SIG field and a second PSDU,
   wherein the first VHT-SIG field includes a class type and a first identifier field, the class type being set to a first value indicating that the first PPDU is destined to the mobile station, the first identifier field indicating a partial identifier formed from the station identifier and having a second length shorter than the first length, and
   wherein the second VHT-SIG field includes a second class type and a second identifier field, the second class type being set to a second value indicating that the second PPDU is destined to the access point, the second identifier field indicating a part of a Basic Service Set Identifier (BSSID) identifying the access point.

2. The method of claim 1, wherein the first PPDU is received and the second PPDU is transmitted by adapting single-user multiple input multiple output (SU-MIMO).

3. The method of claim 1, wherein the first value is different from the second value.

4. The method of claim 1, wherein the first length is 16 bits and the second length is 9 bits.

5. The method of claim 1, wherein the station identifier includes an association identifier that is assigned to the mobile station during an association procedure with the access point.

6. A mobile station comprising:
   a transceiver; and
   a processor functionally connected to the transceiver and configured to:
      instruct the transceiver to receive, from an access point, information about a station identifier having a first length and identifying the mobile station;
      instruct the transceiver to receive, from the access point, a first Physical Layer Convergence Procedure (PLCP) Protocol Data Unit (PPDU) including a first Very High Throughput Signal (VHT-SIG) field and a first PLCP Service Data Unit (PSDU); and
      instruct the transceiver to transmit, to the access point, a second PPDU including a second VHT-SIG field and a second PSDU,
   wherein the first VHT-SIG field includes a class type and a first identifier field, the class type being set to a first value indicating that the first PPDU is destined to the mobile station, the first identifier field indicating a partial identifier formed from the station identifier and having a second length shorter than the first length, and
   wherein the second VHT-SIG field includes a second class type and a second identifier field, the second class type being set to a second value indicating that the second PPDU is destined to the access point, the second identifier field indicating a part of a Basic Service Set Identifier (BSSID) identifying the access point.

7. The mobile station of claim 6, wherein the first length is 16 bits and the second length is 9 bits.

8. The mobile station of claim 6, wherein the station identifier includes an association identifier that is assigned to the mobile station during an association procedure with the access point.

9. A method for transmitting a frame by an access point in a wireless local area network system, the method comprising:
   transmitting, by the access point to a mobile station, information about a station identifier having a first length and identifying the mobile station;
   transmitting, by the access point to the mobile station, a first Physical Layer Convergence Procedure (PLCP) Protocol Data Unit (PPDU) including a first Very High Throughput Signal (VHT-SIG) field and a first PLCP Service Data Unit (PSDU); and
   receiving, by the access point from the mobile station, a second PPDU including a second VHT-SIG field and a second PSDU,
   wherein the first VHT-SIG field includes a class type and a first identifier field, the class type being set to a first value indicating that the first PPDU is destined to the mobile station, the first identifier field indicating a partial identifier formed from the station identifier and having a second length shorter than the first length, and
   wherein the second VHT-SIG field includes a second class type and a second identifier field, the second class type being set to a second value indicating that the second PPDU is destined to the access point, the second identifier field indicating a part of a Basic Service Set Identifier (BSSID) identifying the access point.

10. An access point comprising:
    a transceiver; and
    a processor functionally connected to the transceiver and configured to:
       instruct the transceiver to transmit, to a mobile station, information about a station identifier having a first length and identifying the mobile station;
       instruct the transceiver to transmit, to the mobile station, a first Physical Layer Convergence Procedure (PLCP) Protocol Data Unit (PPDU) including a first Very High Throughput Signal (VHT-SIG) field and a first PLCP Service Data Unit (PSDU); and
       instruct the transceiver to receive, from the mobile station, a second PPDU including a second VHT-SIG field and a second PSDU, wherein the first VHT-SIG field includes a class type and a first identifier field, the class type being set to a first value indicating that the first PPDU is destined to the mobile station, the first identifier field indicating a partial identifier formed from the station identifier and having a second length shorter than the first length, and wherein the second VHT-SIG field includes a second class type and a second identifier field, the second class type being set to a second value indicating that the second PPDU is destined to the access point, the second identifier field indicating a part of a Basic Service Identifier (BSSID) identifying the access point.

* * * * *